(12) United States Patent
Kinney

(10) Patent No.: US 11,580,536 B2
(45) Date of Patent: Feb. 14, 2023

(54) DEPLOYING PHYSICAL DIAMOND TOKENS ON A BLOCKCHAIN

(71) Applicant: Diamond Standard Inc., New York, NY (US)

(72) Inventor: Cormac L. Kinney, New York, NY (US)

(73) Assignee: DIAMOND STANDARD INC., New York, NY (US)

( * ) Notice: Subject to any disclaimer, the term of this patent is extended or adjusted under 35 U.S.C. 154(b) by 268 days.

(21) Appl. No.: 17/089,541

(22) Filed: Nov. 4, 2020

(65) Prior Publication Data

US 2021/0133737 A1   May 6, 2021

Related U.S. Application Data

(60) Provisional application No. 62/930,396, filed on Nov. 4, 2019, provisional application No. 62/930,391, filed
(Continued)

(51) Int. Cl.
*G06Q 20/38* (2012.01)
*H04L 9/32* (2006.01)
(Continued)

(52) U.S. Cl.
CPC ..... *G06Q 20/3825* (2013.01); *G06F 16/2264* (2019.01); *G06F 16/24578* (2019.01);
(Continued)

(58) Field of Classification Search
CPC . G06F 21/105; G06F 8/62; G06F 8/65; G06F 8/71; G06F 2221/0775; G06F 16/285; G06F 16/28; G06F 16/24578; G06F 16/2264; G06Q 20/3825; G06Q 20/0658; G06Q 20/3672; G06Q 20/3674;
(Continued)

(56) References Cited

U.S. PATENT DOCUMENTS 10,523,443 B1 * 12/2019 Kleinman ................. H04L 9/30
11,074,650 B1 *  7/2021 Madisetti ........... G06Q 20/3823
(Continued)

FOREIGN PATENT DOCUMENTS

WO    WO-2018163044 A1 *  9/2018  ......... G06F 16/2315

OTHER PUBLICATIONS

Yu Zhang, et al., An IoT Electric Business Model Based on the Protocol of Bitcoin, Apr. 2, 2015, IEEE, pp. 184-191 (Year: 2015).*
(Continued)

*Primary Examiner* — Neha Patel
*Assistant Examiner* — Nilesh B Khatri
(74) *Attorney, Agent, or Firm* — Perkins Coie LLP; Colin Fowler

(57)   ABSTRACT

A diamond asset comprising one or more diamonds and an encryption chip is used to asset-back a cryptographic token that can be used to conduct transactions. The cryptographic token is written to a blockchain using a smart contract that is configured to enable a transaction associated with the token in response to two or more of: a signature by the encryption chip, a signature by the owner of the diamond asset, and a validation of a visual layout of the diamond asset.

19 Claims, 18 Drawing Sheets

Related U.S. Application Data on Nov. 4, 2019, provisional application No. 62/930,420, filed on Nov. 4, 2019, provisional application No. 62/930,405, filed on Nov. 4, 2019, provisional application No. 62/930,483, filed on Nov. 4, 2019, provisional application No. 62/930,425, filed on Nov. 4, 2019.

(51) Int. Cl.

| | | |
|---|---|---|
| *H04L 9/30* | (2006.01) | |
| *H04L 9/14* | (2006.01) | |
| *G06Q 20/36* | (2012.01) | |
| *H04L 9/06* | (2006.01) | |
| *G06Q 20/06* | (2012.01) | |
| *G06F 16/28* | (2019.01) | |
| *G06F 16/2457* | (2019.01) | |
| *G06Q 30/08* | (2012.01) | |
| *G06Q 40/04* | (2012.01) | |
| *H04W 12/06* | (2021.01) | |
| *G06F 16/22* | (2019.01) | |
| *G06Q 30/018* | (2023.01) | |
| *H04L 9/00* | (2022.01) | |

(52) U.S. Cl.
CPC ............ *G06F 16/28* (2019.01); *G06F 16/285* (2019.01); *G06Q 20/0658* (2013.01); *G06Q 20/3672* (2013.01); *G06Q 20/3674* (2013.01); *G06Q 20/3678* (2013.01); *G06Q 20/3829* (2013.01); *G06Q 30/0185* (2013.01); *G06Q 30/08* (2013.01); *G06Q 40/04* (2013.01); *H04L 9/0618* (2013.01); *H04L 9/0637* (2013.01); *H04L 9/14* (2013.01); *H04L 9/30* (2013.01); *H04L 9/3213* (2013.01); *H04L 9/3278* (2013.01); *H04W 12/06* (2013.01); *G06Q 20/0655* (2013.01); *G06Q 20/389* (2013.01); *G06Q 30/018* (2013.01); *G06Q 2220/00* (2013.01); *H04L 9/50* (2022.05)

(58) Field of Classification Search
CPC .......... G06Q 20/3678; G06Q 20/3829; G06Q 30/0185; G06Q 30/08; G06Q 40/04; G06Q 20/389; G06Q 30/018; G06Q 2220/00; H04L 9/0618; H04L 9/0637; H04L 9/14; H04L 9/30; H04L 9/3213; H04L 9/3278; H04L 9/50; H04W 12/06
See application file for complete search history.

(56) References Cited

U.S. PATENT DOCUMENTS

| | | | |
|---|---|---|---|
| 2003/0030539 A1* | 2/2003 | McGarry | G07F 9/002 340/5.9 |
| 2008/0094214 A1 | 4/2008 | Azevedo et al. | |
| 2013/0328661 A1 | 12/2013 | Phillips et al. | |
| 2015/0223580 A1 | 8/2015 | Kinney et al. | |
| 2018/0078843 A1 | 3/2018 | Tran et al. | |
| 2019/0328661 A1 | 10/2019 | Sommer et al. | |
| 2019/0366475 A1* | 12/2019 | Scarselli | H04L 9/3247 |
| 2020/0410509 A1* | 12/2020 | Xu | G06Q 30/018 |

OTHER PUBLICATIONS

International Search Report and Written Opinion dated Feb. 2, 2021 for PCT Application No. PCT/US20/58952, 15 pages.

\* cited by examiner

FIG. 8A

| Type | Carats | Color | Clarity | Flour | Cut | Sym | Polish |
|------|--------|-------|---------|-------|-----|-----|--------|
| RB | 0.31 | G | VS1 | None | VG | VG | VG |
| | DSC BID | | 375.50 | | | | |
| | DSC LAST | | 375.25 | | | | |
| Pct | 1.1% | 5.6% | 1.5% | 2.7% | 3.1% | 3.4% | 2.9% |
| Better | 0.32 | F | VVS2 | - | X | X | X |
| BID | 0.31 | G | VS1 | None | VG | VG | VG |
| Worse | 0.30 | H | VS2 | Faint | G | G | G |
| Pct | -2.0% | -7.1% | -1.2% | -2.3% | -3.4% | -3.1% | -2.9% |
| Display: | Carats | Color | Clarity | Flour | Cut | Sym | Polish |
| | [x] | [+] | [-] | [x] | [+] | [+] | [+] |

```
                          7%   419
                          6%   275
                          5%   139
         Asks  ────→      4%    40
                          3%    17       ← 17 diamonds are offered
                          2%     5         on the exchange with one
                          1%     3         of any of the selected
                                           factors better or worse
DSC BID              $375.50              than the current
                       2   -1%             diamond, with an ask,
                       6   -2%             adjusted by the premium
                      15   -3%             or discount for the
         Bids  ────→  22   -4%             deviated factor, within 3%
                      82   -5%             above the DSC bid.
                     155   -6%
                     312   -7%
```

Traders choose which factors to allow to deviate, for display in the order book (direction can be both (x), plus or minus)

FIG. 9

DEPLOYING PHYSICAL DIAMOND TOKENS ON A BLOCKCHAIN

CROSS-REFERENCE TO RELATED APPLICATIONS

This application claims the benefit of U.S. Provisional Application Nos. 62/930,420; 62/930,391; 62/930,396; 62/930,425; 62/930,483; and 62/930,405; all filed Nov. 4, 2019, and each of which is incorporated herein by reference in its entirety.

TECHNICAL FIELD

This disclosure relates to systems and methods for deploying a cryptographic token associated with a diamond-backed commodity on a blockchain.

BACKGROUND OF THE INVENTION

Traditionally, true currencies have three characteristics: reliable store of value, utility acceptability, and price stability. A store of value is the function of an asset that can be saved, retrieved and exchanged at a later time, and be predictably valuable when retrieved. Stable coins necessarily require trust and centralization, requiring actors such as trusted issuers, custodians, auditors/authenticators, and governments. However, this undermines the key value of the blockchain, which is a decentralized ledger.

Bitcoin, the first implementation of a cryptographic currency based on the Satoshi Nakamoto blockchain system, has been a wildly successful proof of concept. However, Bitcoin has also exposed its numerous deficiencies, including: lack of asset backing, resulting in volatility and consumer skepticism; singular network, with inefficient proof-of-work protocol; lack of scalability due to high transaction costs and low transaction rate, precluding the primary intended use, as a means of payment; inelastic fixed supply, ensuring deflation, volatility and hoarding; opportunity for fraud, price manipulation, wash trades and fake volume; lack of recourse for theft, inheritance or lost keys; lack of interoperability with advancing network technologies; lack of regulatory features, resulting in governmental repudiation; unfairness of initial distributions to early adopters; and advantages gained by localized, subsidized miners.

Stable coins attempt to solve the primary deficiency of Bitcoin—which is the lack of a store of value. For example, Tether, a token pegged to the U.S. Dollar and originally operated in the Bitcoin network, is the most popular stable coin. Tether, and most other current stable coins have deficiencies, including: a central authority is entrusted to manage the asset reserve; a central authority is entrusted to issue the tokens; one custodian, or a small number, is entrusted to hold the asset reserve; an auditor is entrusted to confirm the reserve; an assayer is entrusted to authenticate the reserve; the transactions are limited to one blockchain network; a government, IRS, or judge can disable a centralized stable coin easily; and pegging the stable coin to a fiat currency or currency basket, inherits the risk of politically driven manipulation of those currencies. Particularly with respect to pegging to a fiat currency, a core goal of cryptocurrency is to reduce the political risk, which has inevitably resulted in manipulation of the money supply to consolidate power—fiat backed stable coins defeats this cornerstone of having a cryptocurrency.

Therefore, what is needed is a crowdsourced decentralized reserve comprised of a real asset-backed commodity that resolves the foregoing deficiencies of the Bitcoin and stable coins. Natural diamond, while it is a uniquely dense-value asset and could be the ideal asset-backed commodity, the diamond industry is affected by the age-old problem that diamonds are not fungible. The prices of seemingly identical diamonds can vary in price considerably. Valuation of diamonds cannot be done on the spot. Authentication of diamonds that are actively traded poses an especially serious problem of authentication, including the substitution of fake or non-genuine diamonds for real diamonds, given the thousands of dollars price tag of individual diamonds.

Moreover, the supply chain for diamonds is opaque, high friction, and inefficient. Presently, creating a marketplace in diamonds is compromised by counterfeit items in the supply chain or channels. The possibility of counterfeits creates the potential for unacceptable losses to purchasers, causing friction in trade and limiting the market to few sophisticated participants. A second difficulty with creating a marketplace for diamonds is that owners may typically want to store their diamond merchandise with a third party, for example, a diamond warehouse, but require an authentic, convenient and highly reliable system for ascertaining that the specific goods are being held as agreed, without relying on the naked assurance of a third party alone.

BRIEF DESCRIPTION OF THE DRAWINGS

FIGS. 8A-8B show example screenshots from a web application executed by a device of the owners of a diamond commodity and its associated token.

FIG. 9 illustrates a set of parameters associated with diamond search and bid.

DETAILED DESCRIPTION OF THE DRAWINGS

System Overview

Figure 1:
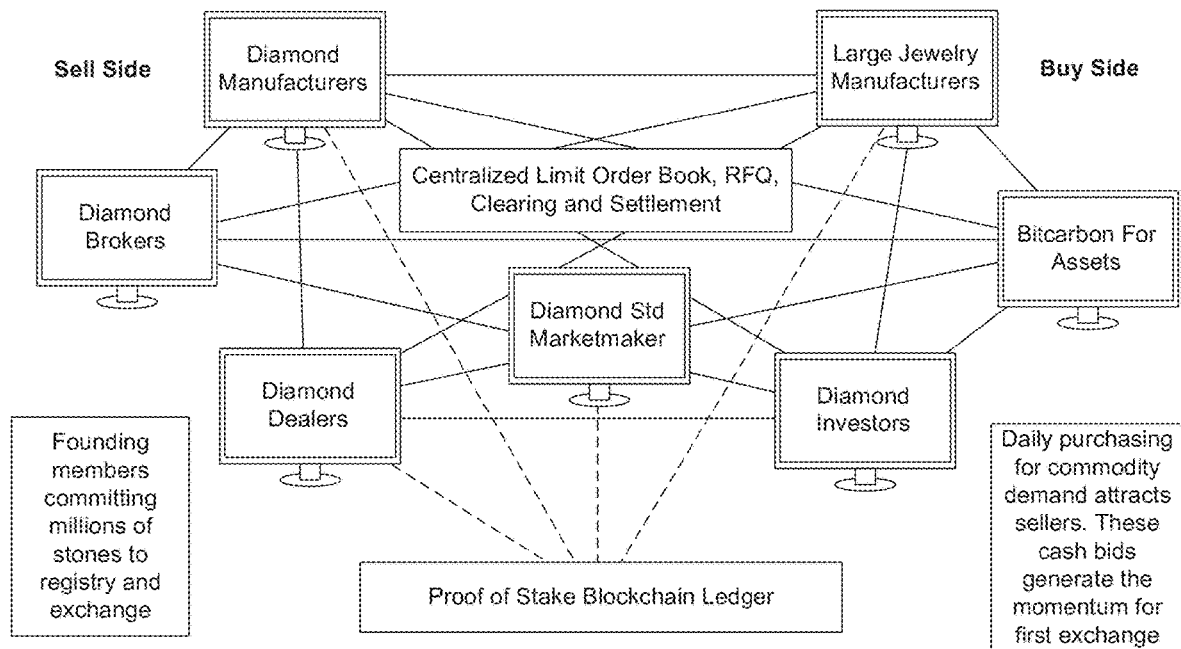
FIG. 1 is a schematic diagram illustrating a diamond-backed commodity exchange.

FIG. 1 is a schematic diagram illustrating a diamond-backed commodity exchange, according to some embodiments. The exchange includes a centralized limit order book, listing a variety of types of natural diamonds across a range of diamond quality. Members of the exchange can access the order book to view prices of diamonds or trade their diamond-backed commodities. The diamonds are associated with cryptographic tokens that can be traded on the exchange.

As shown in FIG. 1, the exchange can be centered around a diamond standard market maker system. The market maker system can include on or more computing devices (such as a personal computer, a server, or a distributed computing system) that can maintain the order book and facilitate interactions between other entities in the commodity exchange.

The exchange connects sellers and buyers of diamonds to solve problems both in the diamond industry and with existing cryptocurrencies. The exchange creates a fungible diamond commodity and a member- and network-owned electronic exchange to price and supply diamonds efficiently, improving the sales process for entities such as diamond manufacturers, diamond brokers, and diamond dealers. The exchange also creates a cryptographic asset that has a value backed by the value of a physical asset, improving the universality and reducing the volatility of the cryptographic asset over conventional cryptographic currencies.

The market maker system can be used by a trader to purchaser samples of diamonds across a range of possible properties of the diamonds. The diamonds can be sorted into sets. In some embodiments, the sets can include diamonds of similar scarcity, determined for example based on natural frequency of each diamond's properties over a specified period of time (e.g., 50 years).

In some embodiments, the market maker system bids on a range of diamond types to purchase a valid statistical sample of diamonds. The market maker system can automatically raise and lower bids for different types of diamonds as bids are accepted or rejected. As bids are accepted, the market maker system can cancel bids for similar diamonds until a sample of diamonds is acquired that has a median achieving a specified standard within a threshold margin of error (e.g., 2%).

Embodiments herein are described with respect to physical diamond commodities that asset-back cryptographic tokens in the commodity exchange. However, systems and methods described herein can instead be implemented using other physical commodities instead of or in addition to diamonds to asset-back the commodity exchange, such as other gems or precious metals.

Figure 2:
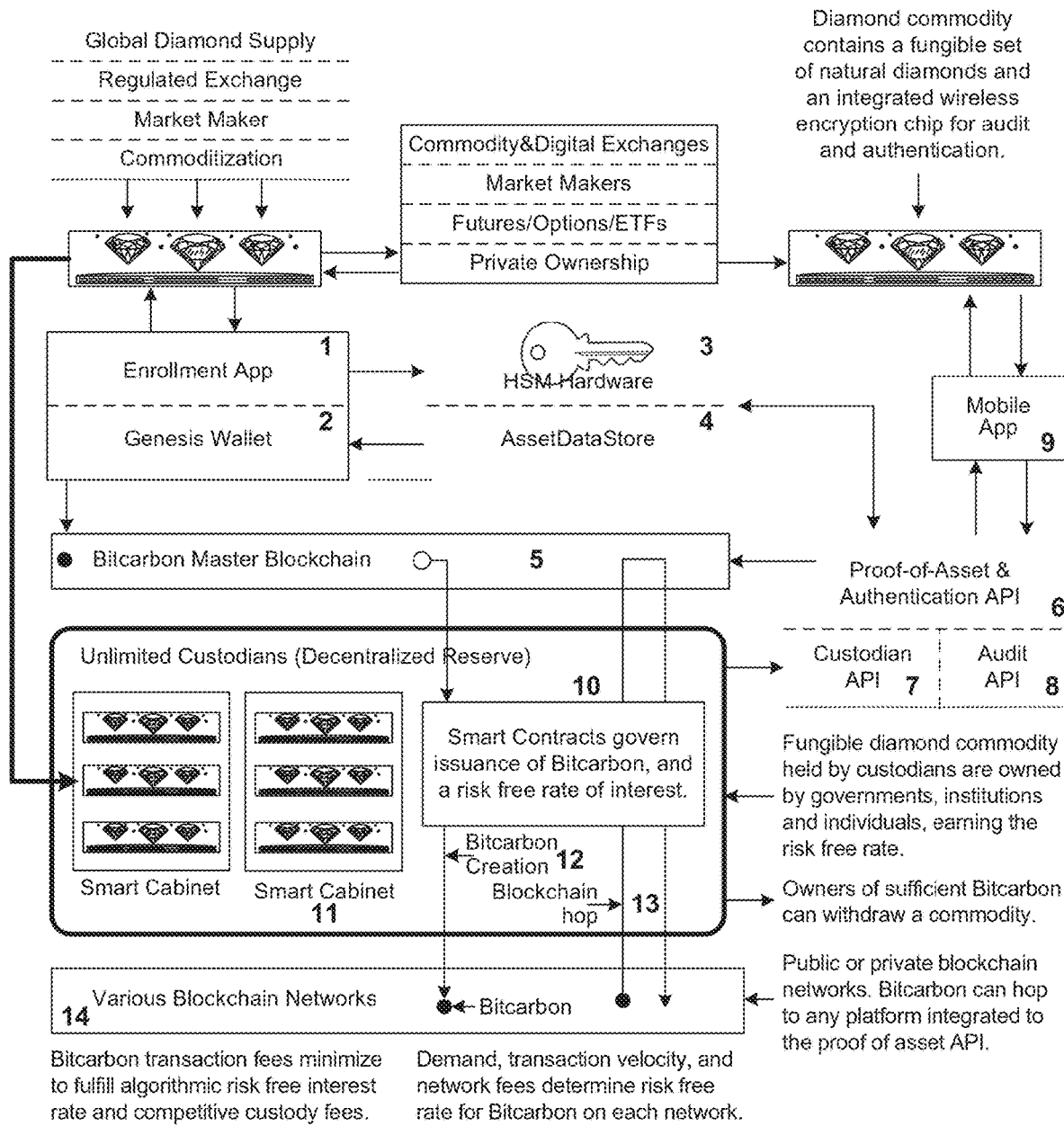
FIG. 2 illustrates an example system architecture enabling the diamond-backed commodity exchange.

FIG. 2 illustrates an example system architecture enabling the diamond-backed commodity exchange. A diamond commodity is created using a set of diamonds selected by the market maker system. The diamond commodity incorporates the set of diamonds into tamper-proof packaging with an encryption chip that can be queried to demonstrate ownership of the commodity. The diamond commodity is described further with respect to FIG. 4.

The diamond commodity can be purchased by a person or entity, referred to herein as an "owner," and either maintained for personal use or registered to the commodity exchange. If the owner desires to register the commodity to the exchange, the commodity can be deposited with a custodian. The custodian stores the commodity in a smart cabinet configured to query the encryption chip in the commodity whenever ownership needs to be demonstrated.

Once the diamond commodity has been registered to the exchange, a token can be generated to represent the owner's ownership of the commodity. The token can be used on one or more blockchain platforms to conduct transactions on the blockchains. In some embodiments, a single token is generated for each registered diamond commodity, and no tokens are used in the exchange that are not backed by a corresponding diamond commodity. The value of a token can be represented as a specified number of coins of a cryptographic currency.

In some embodiments, transactions in the exchange use smart contracts associated with the tokens. One or more application programming interfaces (APIs) can be used to access the blockchains to write contracts to a blockchain or access a contract stored on the blockchain to effect a transaction. An API can also be used to query the diamond commodities stored by custodians, allowing owners to remotely audit the commodities. The APIs can be executed by any computing devices used by owners, custodians, or other parties to the exchange.

When a transaction is conducted in the commodity exchange, the diamond commodity is queried to verify its ownership and the encryption chip on the diamond commodity signs the smart contract. The contract can also be signed by the owner of the commodity and, in some cases, the custodian holding the commodity. Once the contract has been signed by the commodity itself as well as the owner and/or custodian, the contract is executed to perform the transaction. Signatures by the commodity or the custodian holding the commodity, in addition to a signature by the ownership, improves security of the transactions by reducing the likelihood of theft of the asset token. For example, theft of the diamond commodity does not itself transfer ownership of the token backed by the commodity. Similarly, a stolen owner's private key does not grant the thief the ability to conduct transactions backed by the commodity without the custodian or the commodity itself signing the transaction. Furthermore, if transactions related to the asset token are disputed, physical removal of the diamond commodity from the custodian can freeze the token until the dispute has been resolved.

The token associated with a diamond commodity can be used for a wide variety of digital applications. For example, the token can be attached to a transaction as a lien, enabling the owner to pledge the token and its underlying diamond commodity to asset-back a cryptographic transaction. The lien feature enables the token to be used as a security for any trade, loan, sale, or other smart contract on a blockchain platform. As another example, the token or diamond commodity may be loaned to a decentralized reserve to asset-back transactions. The owner can collect a fee for the loan or split a fee with a custodian who loans the commodity to the reserve. Other example transactions allow the owner to transfer ownership of the commodity and its token as a method of payment for goods or services.

Figure 3:
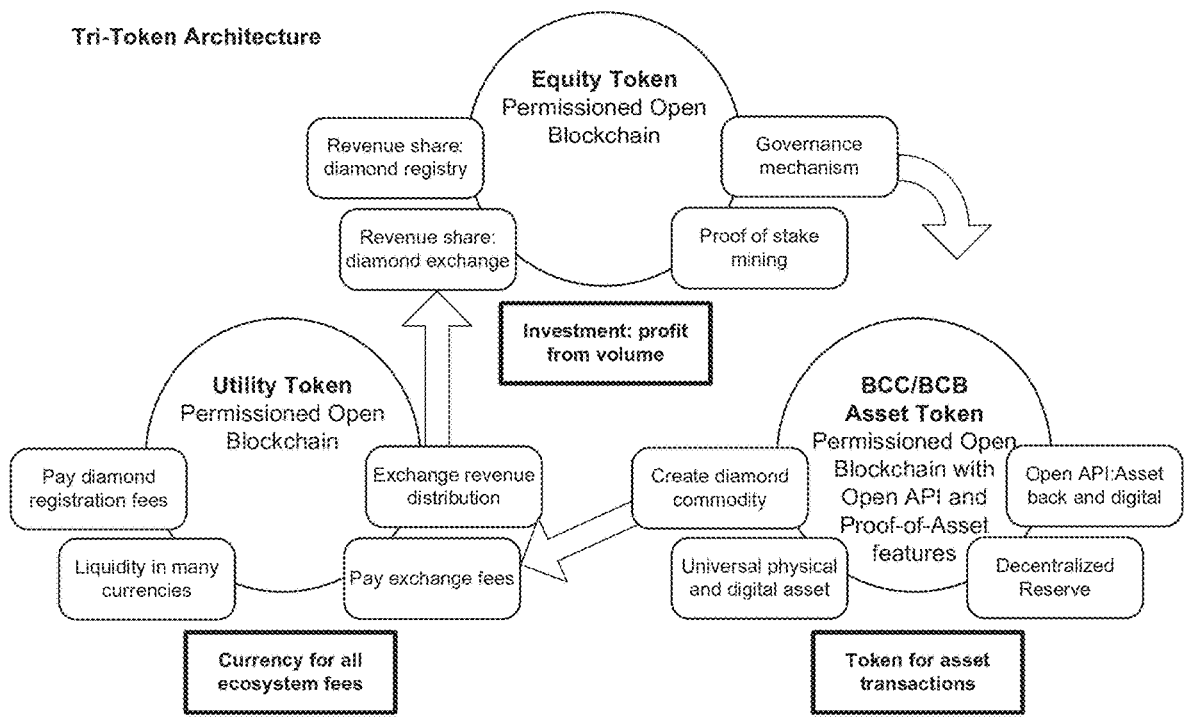
FIG. 3 is a diagram illustrating an example architecture of tokens used in the commodity exchange.

FIG. 3 is a diagram illustrating an example architecture of tokens used in the commodity exchange. As shown in FIG. 3, the diamond-backed commodity exchange uses three digital tokens to manage transactions and ownership in the exchange: an equity token, a utility token, and an asset token.

The equity token can be used to manage equity, dividends, and governance of the commodity exchange. In some embodiments, equity tokens govern and receive revenue from the commodity exchange ecosystem. Equity tokens can earn a share of revenue from the registration of certified diamonds, as well as a share of fee revenue from trades of the diamonds on the commodity exchange. The equity token can be on an equity blockchain.

The utility token can be used as credit for transaction fees within the commodity exchange. Profits from transactions in the commodity exchange can be distributed to owners of the equity tokens in the form of utility tokens. The equity token owners can then sell utility tokens back to the exchange or to the market as the utility tokens are repurchased for diamond registration or exchange fees by other users.

The asset token represents ownership of a physical diamond commodity. Each asset token can be tied to a specific physical diamond commodity, and each physical diamond commodity can be represented by one asset token. When a physical diamond commodity is manufactured, the embedded chip is registered in the authentication system and information about the physical diamond commodity is stored on a master blockchain in association with the corresponding asset token. The physical diamond commodity can be used as a portable asset offline, meaning that no digital transactions backed by its value can take place. However, once the commodity has been deposited with a custodian, it becomes a fungible digital asset that can be traded through the exchange.

Figure 4A:
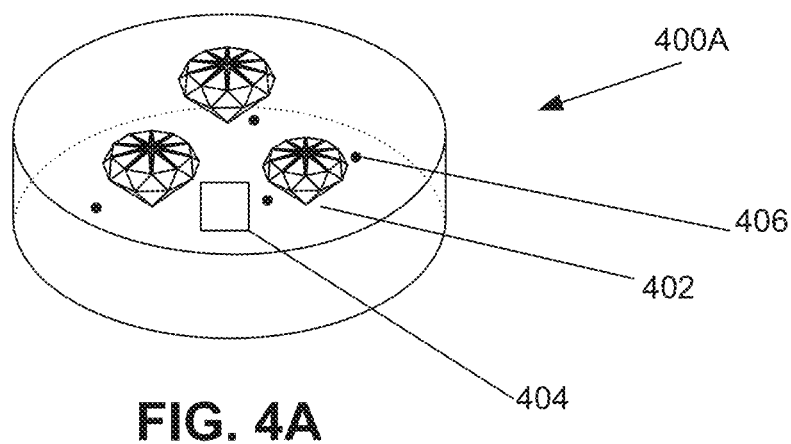
FIGS. 4A-E illustrate example embodiments of the diamond commodity.
Figure 4B:
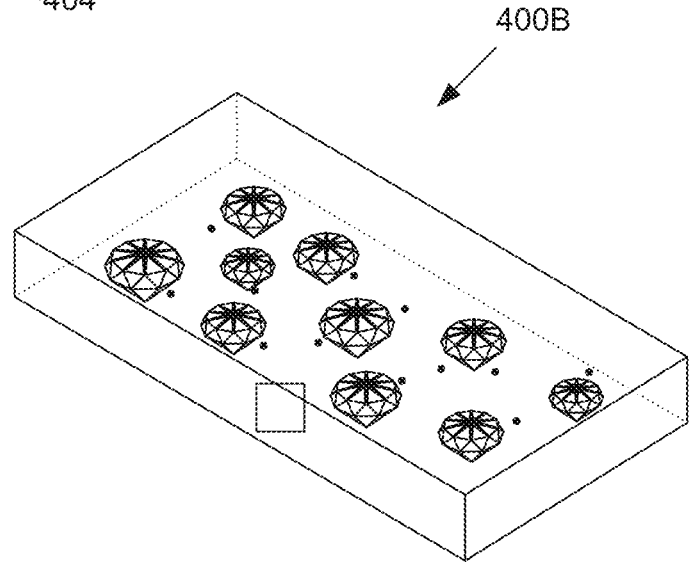
Figure 4C:
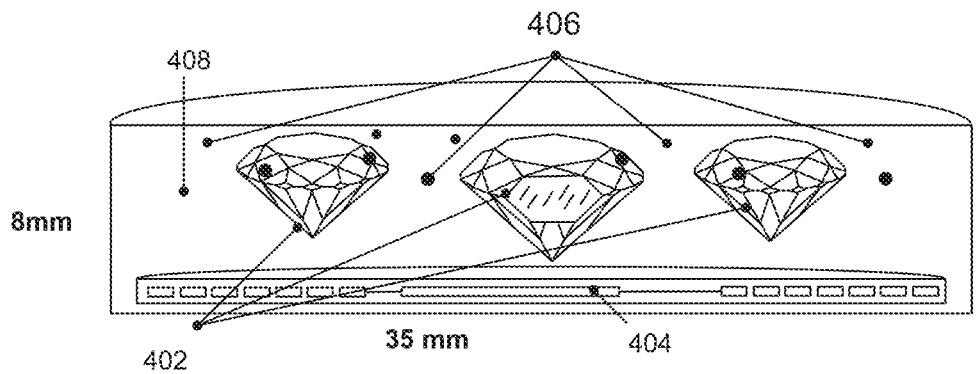

FIGS. 4A-4C illustrate example embodiments of the diamond commodity. FIG. 4A illustrates a diamond commodity can be a coin or puck 400A, while FIG. 4B illustrates a diamond commodity can be a bar 400B. The coin 400A and the bar 400B each contain a set of certified diamonds 402, sealed with a wireless encryption chip 404 and taggants 406 for authentication. In some embodiments, each coin 400A with the same nominal value contains a set of diamonds with an aggregate value equivalent to the nominal value at the time of issuance.

Figure 4D:
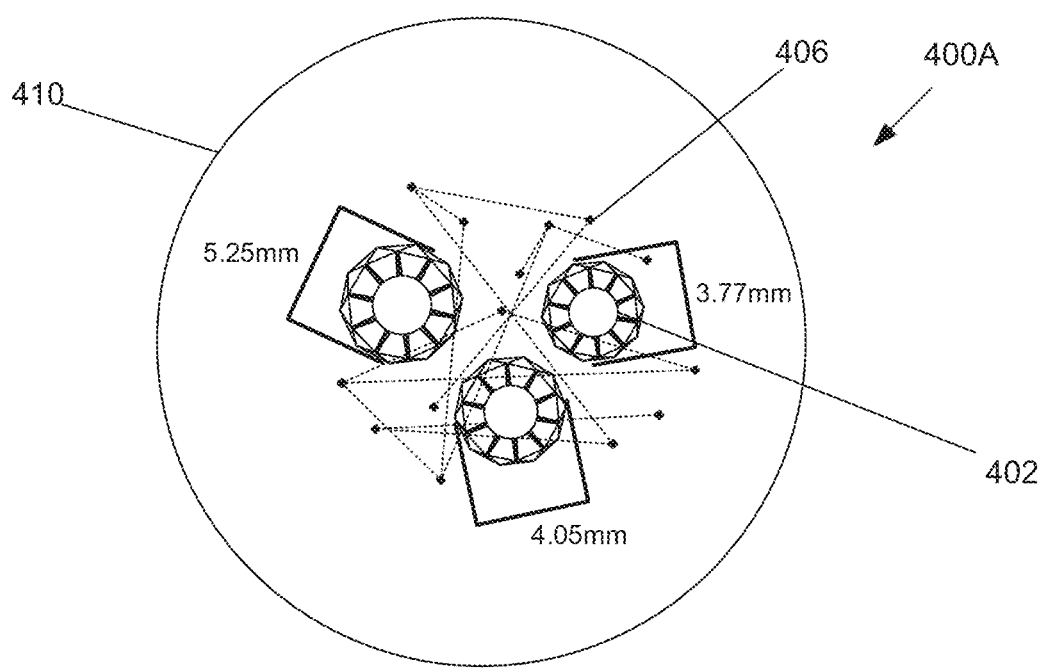
Figure 4E:
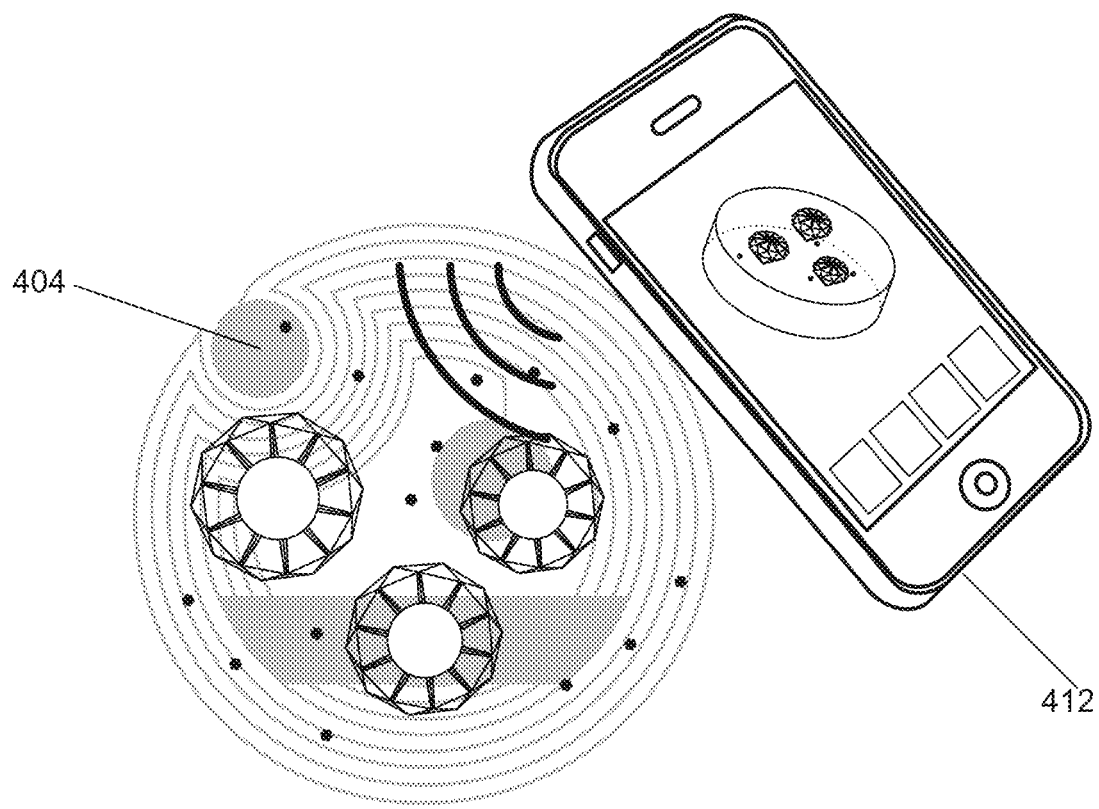

To ensure authenticity of the diamonds, the diamond commodity may incorporate visual and/or electronic tamper-evident means to detect tamper of the encased diamonds. For instance, FIGS. 4C-4E illustrate some tamper-evident measures that can be used with the commodity. FIG. 4C illustrates a cross-sectional view of a coin. As shown, the diamonds 402 are sealed in a puck 400A, which can be cast from a clear resin 408. Also sealed in the puck 400A are a plurality of luminescent taggants 406 and a wireless encryption chip 404 with blockchain interface. The wireless encryption chip 404 may be fitted with antenna such as NFC (near-field communication) and/or RFID (radio-frequency identification) for authentication via electronic devices such as a smart phone or a smart cabinet introduced herein. In some embodiments, the puck 400A is a standardized size. In the illustrative example of the figure, the puck 400A has a 35 mm diameter and an 8 mm height.

As shown in FIG. 4D, to further prevent tampering or counterfeiting of the commodity, the puck 400A can include a distribution of taggants 406, such as microspheres, that dispersed randomly near the diamonds to create a visual pattern unique to each commodity. The taggants 406 can be made from a variety of natural or synthetic materials, including glass, polymer, or ceramic, and can be optically detectable in visible or non-visible light spectra. The position of the taggants 406 relative to reference objects, such as the diamonds 402, the other taggants, or the edge 410 of the puck 400A can be registered and used for authentication at a later time.

In some embodiments, the distribution of diamonds and taggants is calculated on a basis of ratios. That is a comparative distance from each other element and/or the edge of the puck. In this manner, an optical validation is performed where each distance is treated as a variable and each distance is solved for relative to other distances (which are similarly stored as unknown variables). Examples of when a user would perform the optical validation are during a trade of the puck between users who are within physical proximity of one another (e.g., and can clearly validate that the other user is validating a physical object rather than a picture) or when a custodian initially takes physical possession of a given puck and accepts liability for the puck and its contents.

In some embodiments, the smart contract associated with the cryptographic token linked to the puck includes a specified or known physical characteristic of the puck. The known physical characteristic is used during an optical validation of the puck to derive actual sizes/distances of the elements of the puck (e.g., diamonds and taggants). For example, where the physical characteristic is a diameter of the diamonds, this known size may be used along with a derived parallax from the optical sensor used (e.g., the camera on the mobile device) to derive every other length and size within the puck. Thus, rather than store each distance as a variable, exact, true-to-life values are used.

In some embodiments, the specified or known physical characteristic is the diameter of the puck where the diameter of the puck is a standardized value across all such pucks. Where a given value is shared across all pucks, there is little advantage in storing this value specifically with the smart contract associated with the specific cryptographic token linked to any given puck. Rather, the fixed size may be included as part of the authentication protocol.

FIG. 4E shows the authentication of a commodity using a smart phone 412 or a smart cabinet to communicate with the wireless encryption chip 404 sealed in the puck (e.g., a physical unclonable function). In some embodiments, the chip could be a 1,024-bit encryption chip with 8 kB memory, 1 ms read/write time, and 500,000 cycles per second. The blockchain stores certification and transaction data, and physical assets can be remotely audited during digital transactions associated with the diamond-backed tokens on the exchange.

Smart Cabinet

Figure 5A:
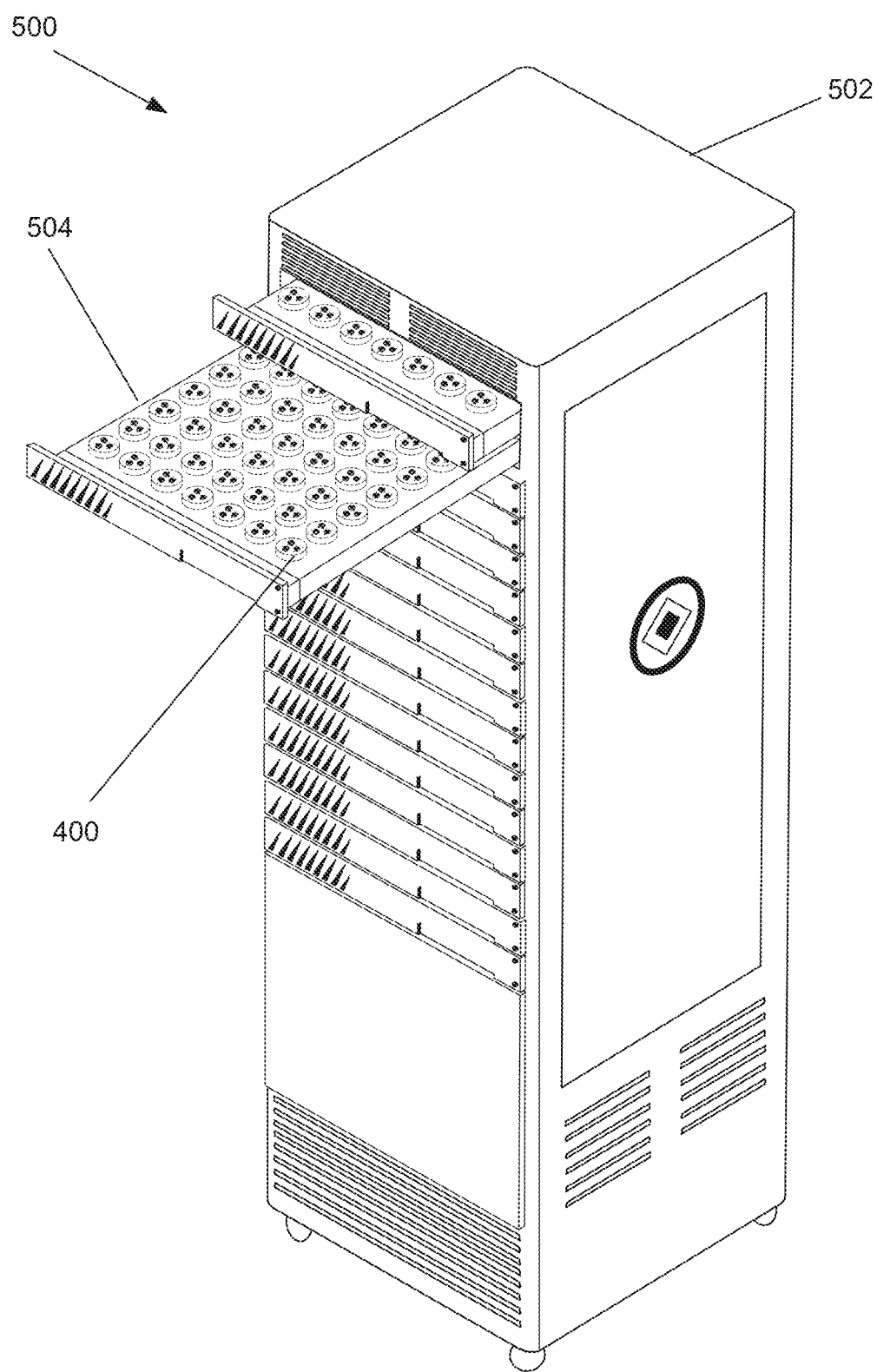
FIGS. 5A and 5B show example embodiments of the smart cabinets.
Figure 5B:
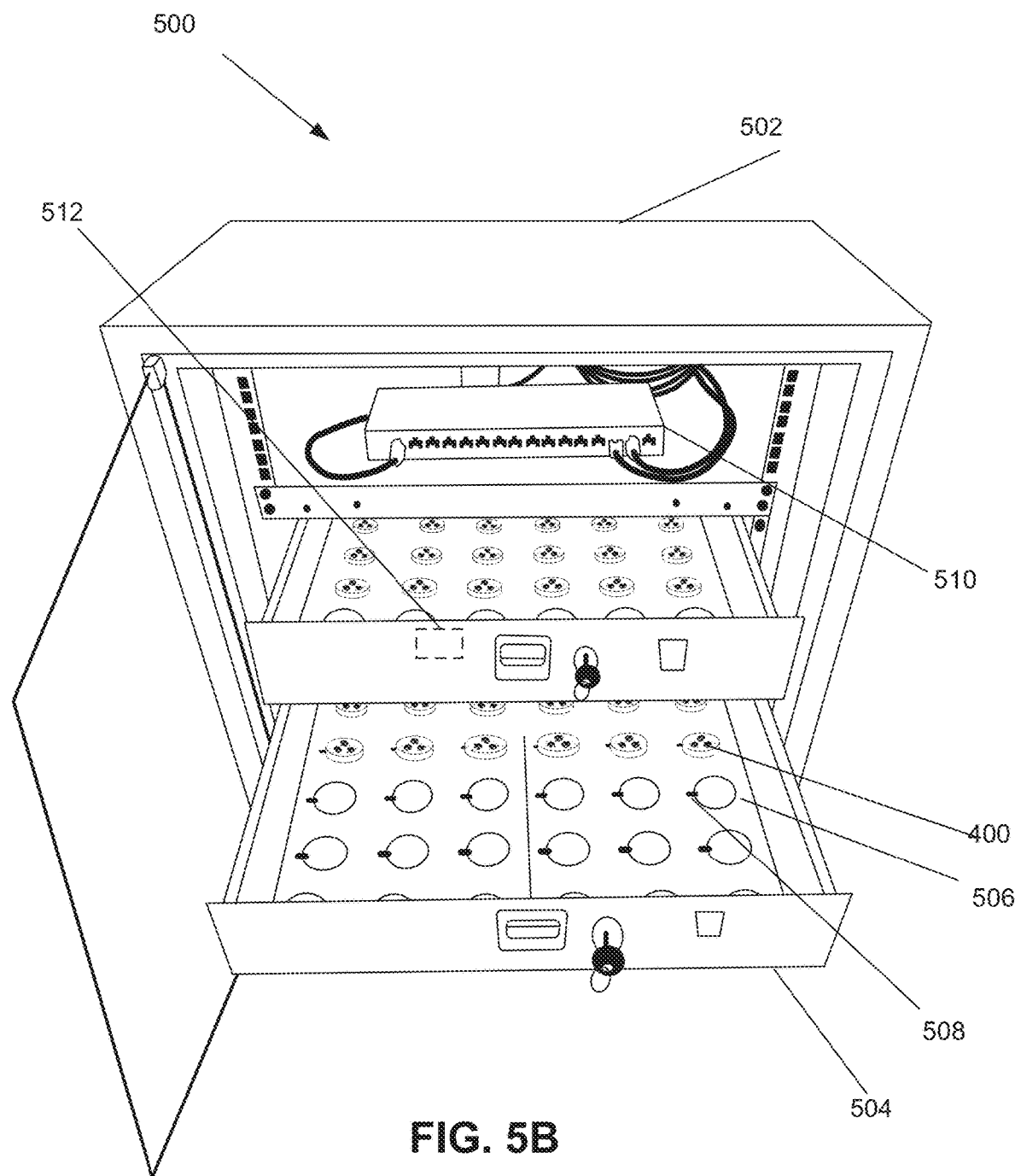

FIGS. 5A and 5B show example embodiments of a smart cabinet 500. In some embodiments, the smart cabinet 500 includes a secured cabinet casing 502 having a plurality of retractable shelves 504. It should be noted that the dimension of the smart cabinet 500 is not restricted a single set of dimensions. The dimension of the smart cabinet 500 can be built depending on the needs of the user, such as the custodian. In one embodiment, the frame of the cabinet can be built using standard rack frames to facilitate installation of modularized shelves. The rack frames may be measured by rack units, which is a unit of measure defined as 1¾ inches (44.45 mm). For instance, the example smart cabinet shown in FIG. 5A is built using a standard 42 U (rack unit) cabinet, which is commonly used for server cabinets. In the other example shown in FIG. 5B, the cabinet can also be built to other dimensions.

Each of the plurality of retractable shelves 504 also has a plurality of compartments 506 arranged thereon for storing the diamond commodities 400 or other types of assets. For example, the particular smart 500 cabinet shown in FIG. 5A enables storage of up 180 diamond commodity coins or 640 diamond commodity bars. According to some embodiments, the distance set between adjacent compartments is configured to substantially reduce interference between adjacent assets when they are in communications with a wireless sensor 508. The wireless sensor 508 is configured to interface with an encryption chip included in each secured container 400 positioned on the retractable shelves 504.

The number of wireless sensors 508 installed in the cabinet can also vary. In some of the embodiments, each of the compartment 506 has a corresponding wireless sensor 508 installed in the base of the compartment to enhance the quality of communication between the wireless sensor 508 and a wireless encryption chip. Alternatively, the smart cabinet 500 is fitted with fewer wireless sensors 508, or even a single wireless sensor 508, to communicate with some or all of the stored assets 400, or other types of assets inside the smart cabinet 500. Depending on the technology used in the wireless encryption chips of the stored assets 400, the wireless sensor 508 can be designed to use one or more types of communication technologies, including NFC (near-field communication) or RFID (radio frequency identification).

In some embodiments, the smart cabinet 500 includes one or more cameras 512 positioned on the retractable shelves 504. In the figure, the camera 512 is positioned on the inside of a front plate of the retractable shelves 504. The camera 512 may be similarly positioned by each wireless sensor 504. The camera 512 may further include a lighting element to enable image capture in an otherwise dark cabinet. The camera 512 is used to capture image data of the assets 400 with sufficient resolution to identify physical characteristics of each individual asset 400 at a precision that enables derivation of an optical validation key. In some embodiments, the camera 512 is repositionable on a motorized track that enables one or both or improved positioning to image a given asset 400 and/or capturing a given asset 400 from multiple angles.

The smart cabinet also contains a processing system 510 which is configured to control the wireless sensors 508 and exchange data between the processing system 510 and a remote authentication server. In some embodiments, the exchange of data includes receiving commands from and sending authentication results to the authentication server and/or a smart contract associated with tokens that correspond to each asset 400. In some embodiments, the smart cabinet 500 may act as a node on a distributed blockchain network having a respective public/private keypair. In some embodiments, the authentication server remotely audits the stored assets during every digital transaction. In other embodiments, it is also possible to configure the processing system 510 to spontaneous audit one or more stored assets (i.e., without first receiving a request from the authentication server). The occurrence of such audits is either scheduled or randomized. In some embodiments a user can force a query, for example to a custodian, regarding the status of a held asset 400. The query verifies the presence of the asset 400 in the smart cabinet 500, and/or adjoins a transfer of ownership over the asset 400. During a transfer, perhaps from one user to another, the first user makes use of an application that transfers a cryptographic token to the other user. In order to achieve the transfer, the custodian affirms physical possession of the asset 400 via a query by the wireless sensors 508 or the camera 512.

The smart cabinet also includes a network device to enable the exchange of data between the processing system 510 and the authentication server/blockchain data structure; the types of network may include but is not limited to internet, cloud, wide area network, or local area network.

Conducting Blockchain Transactions with a Diamond-Backed Token

Figure 6A:
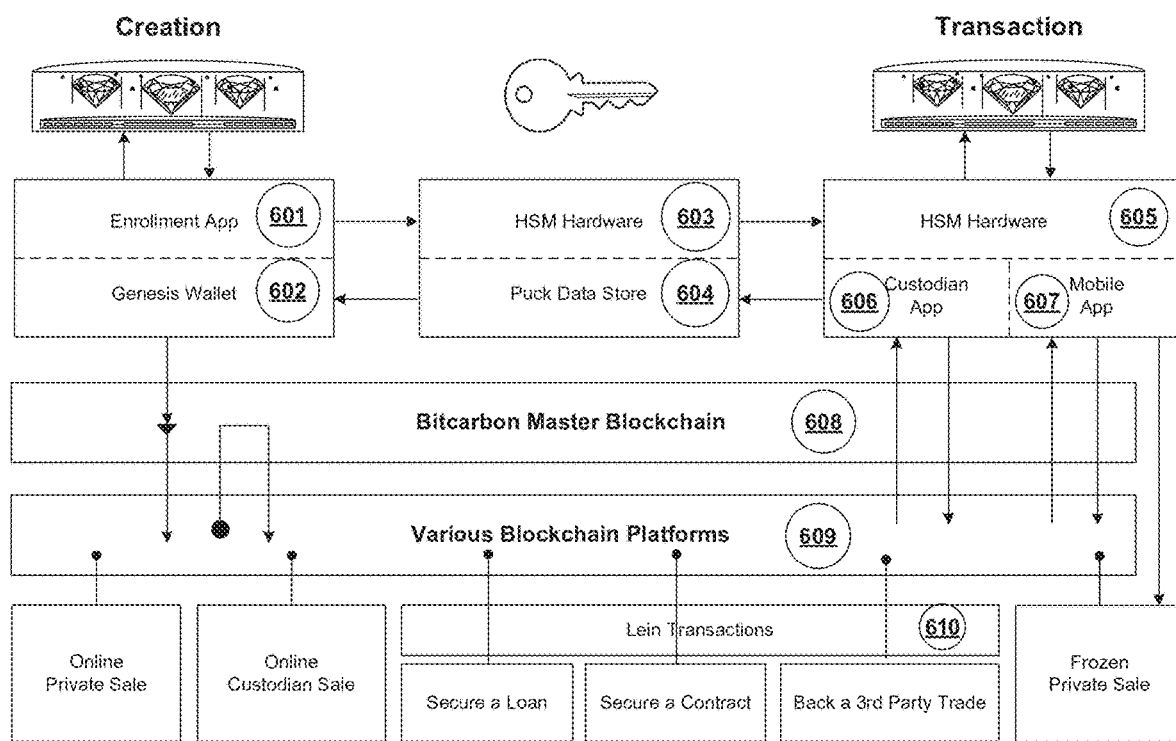
FIG. 6A is a block diagram illustrating a system architecture for performing transactions within a diamond-backed commodity exchange.

FIG. 6A is a block diagram illustrating a system architecture for performing transactions within a diamond-backed commodity exchange, according to some embodiments. The system architecture shown in FIG. 6A can be similar to portions of the system architecture shown in FIG. 2.

As shown in FIG. 6A, the system can include interactions between a master blockchain and one or more other blockchain platforms that support transaction blockchains. In various embodiments, the master blockchain can be a permissioned and open proof-of-stake blockchain (e.g., the EOS blockchain). The transaction blockchains can be built on any blockchain platform, public or private. One or more application programming interfaces (APIs) can be configured to access data stored on the master blockchain and transaction blockchains. In some embodiments, both the custodian of a diamond commodity and the owner of the commodity have devices that can execute an API to access blockchain data.

The master blockchain can record (601) the original issuance of asset tokens, (602) that the commodity backing each asset token consumed registered diamonds, purchased through the exchange with a transparent bid, and/or if an asset token is moved to a transaction blockchain, an identifier of an address or other relevant information about the new location of the asset token. The puck may act as a hardware security module using the positioning and/or size of the diamonds and taggants as a physical key (604). The hardware security module feature may be used during registration (603) and during transactions (605). More specifically, when a physical diamond commodity is first enrolled in the commodity exchange, the commodity can be registered on the master blockchain, by for example storing a smart contract associated with the token on the master blockchain. An asset token can be generated to represent the commodity based on the specifications of the master blockchain (608). As used herein, a "smart contract" is a set of executable instructions, stored on a blockchain, that output a specified result when a set of conditions have been satisfied. A process for registering an asset token on a blockchain using a smart contract is described further with respect to FIG. 6B.

The asset token can be moved to any other blockchain platforms at any time (by, for example, registering new smart contracts on the other blockchain platforms), enabling the owner of the token to use the token for nearly any desired transaction (609). For example, an open API can be used to deploy the token on any platform. If the token is moved from the master blockchain to a different platform, the fact of the token's move can be recorded on the master blockchain.

Once a token has been deployed on a blockchain platform, smart contracts deployed on the same platform attach to the asset token. For example, if a token has been moved from the master blockchain to a transaction blockchain, a future user may be unable to deploy a smart contract on the master blockchain to use the token in a transaction unless the token is returned to the master blockchain platform. Furthermore, in some embodiments, a token cannot be transferred to a different blockchain platform if a lien is attached to the token.

The token can be used for any of a variety of different types of transactions. As shown in FIG. 6A, these transactions may include, for example, an online private sale of the token, an online sale by a custodian of the physical diamond asset backing the token, a frozen private sale, or any of a variety of lien transactions such as securing a loan, securing a contract, or backing a third-party trade (610). For example, the owner of a token may pledge the value of the diamond commodity to take a loan. Alternatively, the owner can pledge the commodity's value as a brokerage, allowing another to pledge the asset for a loan or other purpose. If the owner instead trades the token, the token can be traded as any other cryptographic token, transferring ownership of the private keys to another person. The custodian of the diamond commodity need not change, however.

To enable use of the token across multiple blockchain platforms, any transactions associated with a token are signed by both the current owner of the token (e.g., using the private key of the wallet of the owner) and the physical diamond asset (e.g., using the physical characteristics of the diamonds/taggants or an encryption chip). To conduct a transaction with a token, such as transferring ownership of the token to another person to pay for goods or services, the owner of the token can use the API (606) to access the smart contract on the blockchain where it is stored. The API can cause the diamond commodity to be queried, which signs the contract if the commodity is accessible and capable of being used for the transaction. "Querying" the container itself can take any combination of a number of forms of authorization/authentication. A first form involves querying the encryption chip. The encryption chip operates as a hardware security module and includes a physical unclonable function. The physical unclonable function acts as an additional key to be used during a transaction of the token associated with the container.

A second form involves querying the physical characteristics of the container. Querying the characteristics of the container executes an optical validation of the container using the API as associated with a camera. Optical validation uses the characteristics of the container to derive a key using a smart contract specified protocol, and/or a one-time password. The derived key and/or one-time password is used as an additional key during a transaction of the token. The characteristics of the container include any of combination of the diamonds and taggants therein, the position of each relative to one another and the container edges, and the size of each.

While discussed above, instances of optical validation are performed while validating an object that was before the querying user, in other embodiments, it is contemplated that a malicious actor may attempt to merely use a pre-captured image of the container to derive the necessary key/password. In those embodiments a number of protocol steps may be taken to improve security. First, the protocol of optical validation may require that the image data used by the API is obtained in real-time as "view-finder data" from the camera. It is further contemplated that a malicious actor may merely use the camera to focus the viewfinder on a preexisting picture of the diamond container (e.g., a picture of a picture). However, because pictures do not have a 3D dimension, real-time rotation can validate whether the user is attempting to pass off a picture of a picture. Thus, in some embodiments, an additional protocol step is implemented that requires the user to rotate either of the container and/or the camera device. Either of express instructions (e.g., displayed on screen of the viewfinder) or ad hoc user driven choice of rotation may be implemented. Multiple perspectives of the container captured by the API increase the likelihood that the container is physically present. Where multiple perspectives are used, the protocol may use additional data capture to supplement derivation of the key/password.

Rotation of the device/camera may be further verified by input to an associated accelerometer. Further computer vision techniques may be implemented to identify and disqualify attempts that include framing around the container (e.g., the border of a screen displaying a picture of the container).

The custodian API may be implemented in a mobile device application (607). The owner of the token can also sign the contract using the owner's cryptographic key. The smart contract can be configured to output a desired result, such as transferring ownership of the token, in response to being signed by the diamond commodity and the owner.

The diamond commodity can be queried by a smart cabinet. When a commodity is held by an approved custodian, it can be stored in a smart cabinet featuring an array of wireless near-field communication (NFC) transceivers to audit and authenticate the commodities and perform proof-of-asset verification. The smart cabinet may include a camera that is on a movable track that can reposition and thus capture multiple perspectives of the secured container in accordance with the protocol of some embodiments of the described technique.

In some embodiments, the transfer of the token is authorized by an N of M key scheme. For example, the token has authorization to transfer given signatures from the private key of the containing wallet, and either of the optical validation and the encryption chip response. In another example the token has authorization to transfer given signatures from the private key of the containing wallet and any two of: the optical validation, the encryption chip response, or the private key of the smart cabinet.

Figure 6B:
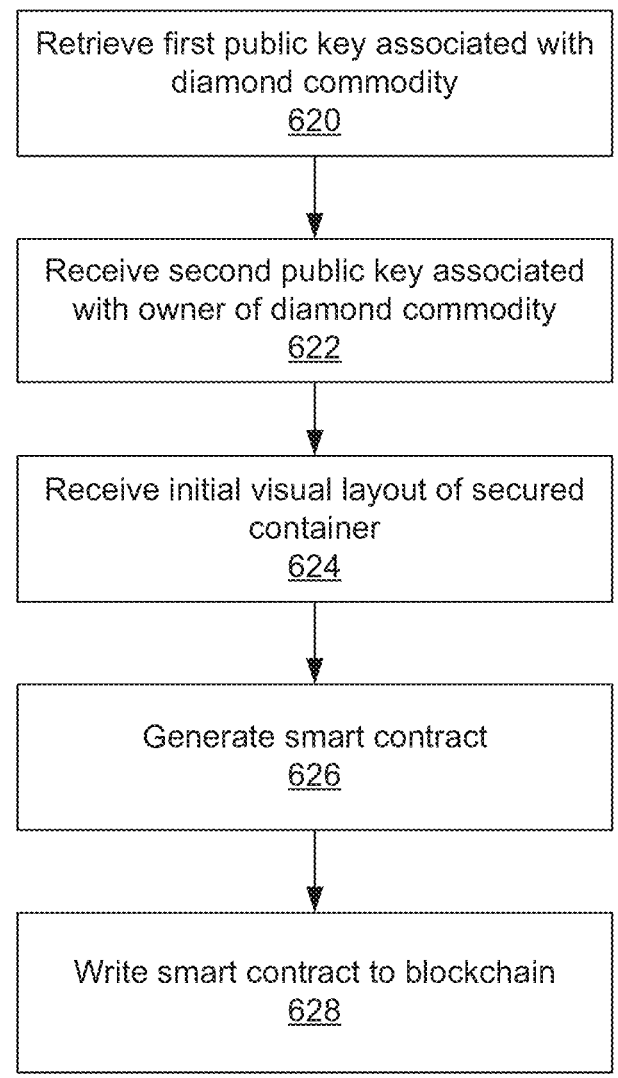
FIG. 6B is a flowchart depicting a process for registering an asset token on a blockchain.

FIG. 6B is a flowchart depicting a process for registering an asset token on a blockchain. The process shown in FIG. 6B can be performed by a computing device, such as a mobile device used by an owner of a diamond commodity, a computing device used by a custodian, or a centralized or distributed server. As described above, a physical diamond commodity includes a secured container housing one or more diamonds, visual taggants, and an encryption chip. The diamond commodity is linked to an asset token that can be attached to transactions when the token is deployed on a blockchain. An owner of a physical diamond commodity can maintain possession of the commodity or deposit it with a custodian. In some implementations, the asset token is deployed on the blockchain for use in transactions when the physical diamond commodity is stored by a custodian. For example, the token is tradeable when the diamond commodity is stored in a custodian's smart cabinet, which is capable of optically validating a physical layout of the commodity and querying the encryption chip of the diamond commodity.

In step 620, as shown in FIG. 6B, the computer system retrieves a first public key that is associated with the diamond commodity. The first public key corresponds to a first private key stored on the diamond commodity's encryption chip, such that the first private key can be authenticated during a transaction using the first public key. In some cases, the encryption chip stores the first public key and the computer system can query the encryption chip to retrieve the first public key, such as by instructing the smart cabinet to query the chip. In other cases, the computer system receives the first public key from the owner of the physical diamond commodity or retrieves the first public key from a memory external to the diamond commodity.

In step 622, the computer system receives a second public key that is associated with the owner of the diamond commodity. The second public key corresponds to a second private key maintained by the owner, such that the owner's private key can be authenticated during a transaction using the second public key. For example, the second private key is maintained by the owner in a cryptographic wallet.

In step 624, the computer system receives an initial visual layout of the secured container. The initial visual layout, representing a visual appearance of the diamonds, the taggants, or both at the time the diamond commodity is deposited with the custodian, can be captured by any camera or imaging system capable of measuring the optical or visible properties of the secured container. For example, the owner of the diamond commodity can capture the initial visual layout using the camera of the owner's mobile device and provide the initial visual layout to the computer system when enrolling the asset token on the blockchain. Additionally or alternatively, the optical system of the custodian's smart cabinet captures the initial visual layout when the custodian takes possession of the diamond commodity or in response to external queries. In this case, the computer system can query the smart cabinet to retrieve a previously-determined initial visual layout, to cause the smart cabinet to determine the initial visual layout during the token registration process, or both. In some embodiments, when registering the asset token to the blockchain, the computer system compares an initial visual layout measured by the owner's device against an initial visual layout measured by the custodian's smart cabinet, generating the smart contract to deploy the asset token on the blockchain only if the owner's and custodian's layouts are determined to match.

In step 626, the computer system generates a smart contract using the first public key, the second public key, and the initial visual layout. The smart contract is generated such that it enables a transaction associated with the cryptographic token in response to an authorization procedure. Embodiments of the authorization procedure use various combinations of the first private key, the second private key, and validation of a current visual layout of the secured container. For example, the smart contract can be written to enable a transaction only if it is signed by the encryption chip using the first private key, signed by the owner using the second private key, and optically validated by the custodian's smart cabinet. Another example smart contract enables a transaction if it is signed by the owner using the second private key, and is either signed by the encryption chip or optically validated by the smart cabinet.

In step 628, the computer system writes the smart contract to a blockchain, such as the master blockchain.

Figure 7A:
FIGS. 7A-7E are screenshots of an example mobile application executed by a device of the owners of a diamond commodity and its associated token.
Figure 7B:
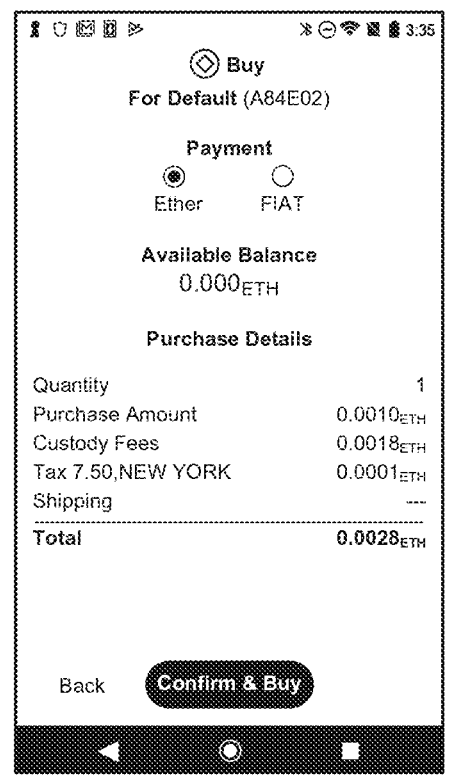
Figure 7C:
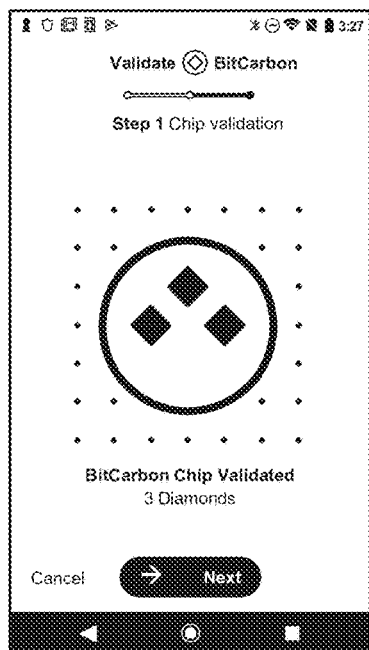
Figure 7D:
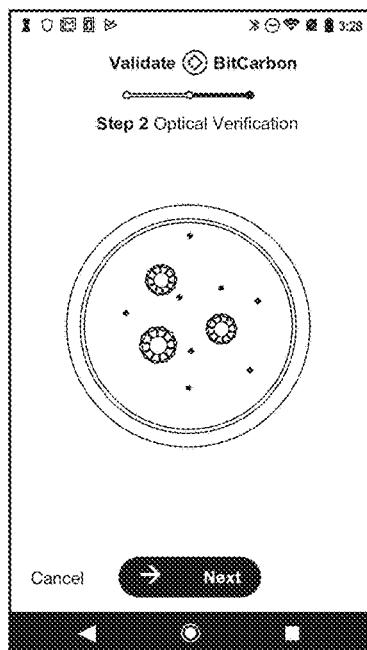
Figure 7E:
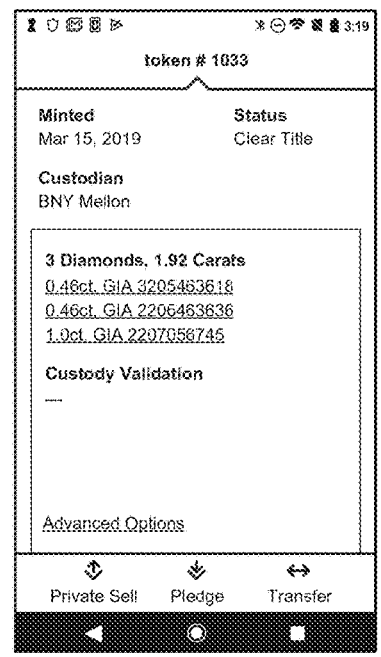

FIGS. 7A-7E are screenshots of an example mobile application executed by a device of the owners of a diamond commodity and its associated token. FIG. 7A lists the tokens owned by the owner, along with a value of the tokens, information about the custodian, and a mint date of the tokens. FIG. 7B shows an example screen for purchasing a token. FIGS. 7C-7D show example screens that can be displayed when the owner is conducting a sale of the token. As shown in FIG. 7C, the mobile application can query the diamond commodity backing a token (e.g., using an API) to validate the encryption chip on the commodity. As shown in FIG. 7D, the mobile application can cause an optical validation to be performed on the commodity, for example verifying optically that the same number of diamonds are present, in the expected configuration, with an expected arrangement of visual indicators (e.g., dots) disposed across the commodity. FIG. 7E shows an example screen that can be displayed if the owner wants to perform a transaction to sell or pledge the token and its associated commodity.

Figure 8A:
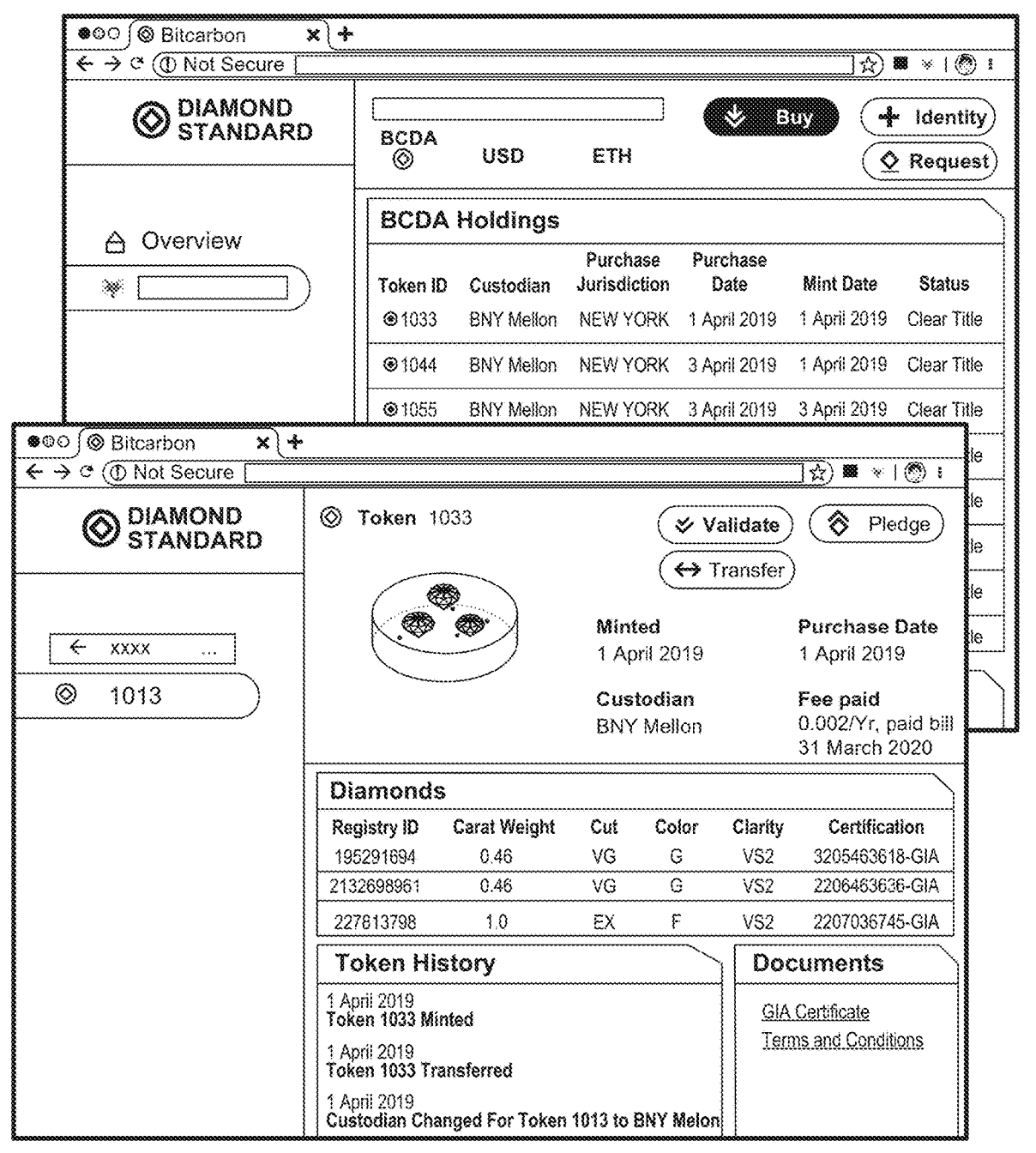
Figure 8B:
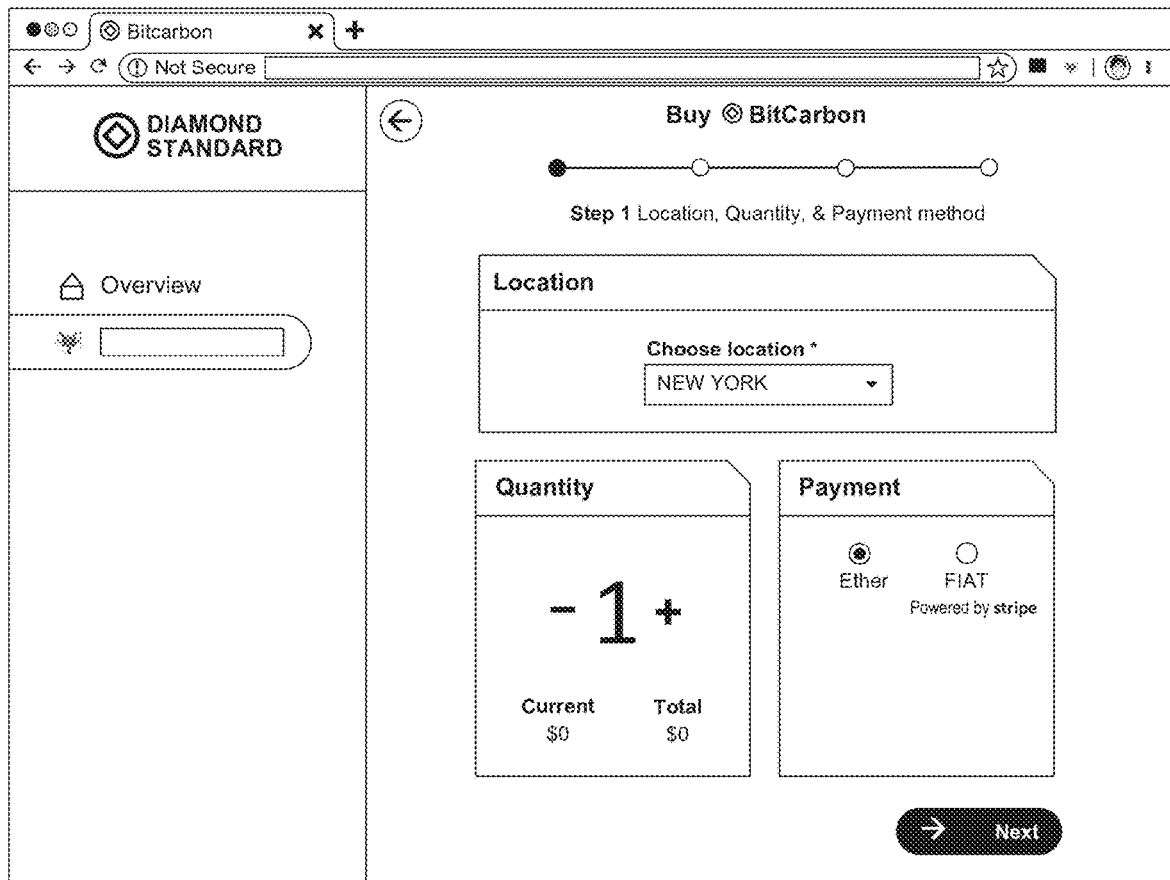

FIGS. 8A-8B show example screenshots from a web application that can be used instead of or in addition to the mobile application described with respect to FIG. 7. Features and actions enabled the website can include, for example:

Purchasing tokens and associated diamond commodities, and selecting whether to take delivery of the commodity or choose a custodian;
Auditing diamond commodities stored with custodians;
Inspecting diamond certificates associated with commodities;
Transferring tokens to another address;
Arranging to take delivery;
Offering tokens for sale on the exchange;
Attaching a token to a smart contract; or
Providing or retracting asset lending agreements.

Centralized Order Book

The diamond exchange described with respect to FIGS. 1-3 can have an active, one-sided market maker who bids for a wide variety of diamonds. The diamonds used for the exchange may have any combination of properties. These properties can include, for example, carat weight, color, clarity, fluorescence, cut, symmetry, and/or polish. In order to assemble a fair and transparent commodity, the trader purchases samples of diamonds across the range of diamonds that may be used for the commodity exchange. However, diamonds can be a difficult commodity to accurately value because each diamond's particular combination of properties can be rare. Diamonds are further difficult to group and categorize as a result of the various properties.

As a result, an order book formed around the properties of a particular diamond has limited depth. Market prices for diamonds also may not linearly or consistently follow minor variations in the diamonds' properties. Where securities tend to be fungible assets, diamonds are not. While diamonds are not necessarily unique, there are relatively few with exact matching properties. As a result, there is no market capability to obtain a "bulk rate." However, a tolerance of variance from a target position with pre-calculated bid values for each potential diamond within the tolerance enables the new action of giving a diamond market depth of inventory.

Thus, for a trader who may purchase solely based on certified grade, without a visual inspection, determining a price to bid for a particular diamond may be challenging. To assist traders in searching and bidding for diamonds, the market maker system generates a centralized limit order book that can be dynamically generated around a target diamond to accurately price the target diamond.

Through use of a target diamond and thresholds established based on the various properties of the target diamond, a search engine can identify a better grouping of search results.

Generally, a trader makes regular actionable bids for any type of diamond. These bids may be based on a gemological certificate associated with the diamond. The table below illustrates example bids that the trader may place for diamonds with varying properties:

TABLE 1

| Carats | Color | Clarity | Flour | Cut | Sym | Polish | Bid |
|---|---|---|---|---|---|---|---|
| 0.30 | G | VS1 | None | VG | VG | VG | 375.50 |
| 0.31 | G | VS1 | None | VG | VG | VG | 379.75 |
| 0.32 | G | VS1 | None | VG | VG | VG | 376.00 |
| 0.31 | F | VS1 | None | VG | VG | VG | 381.25 |
| 0.31 | H | VS1 | None | VG | VG | VG | 364.75 |
| 0.31 | G | VVS2 | None | VG | VG | VG | 379.50 |
| 0.31 | G | VS2 | None | VG | VG | VG | 370.75 |

The bids can be represented as a dynamic premium or discount (as a percentage) for every change in factor, relative to a target diamond. For example, the following table shows a target (bold) diamond. For each property of the target diamond, the table shows a diamond with a property that is better than the target diamond and a corresponding percentage premium of the better diamond (representing a difference between the price of the better diamond and the bid price of the target diamond, as a percentage). The bid value for the target diamond is based on a previously made bid by the given trader. The bid value can be set in the search engine and further calculations are made stemming from this value. The table is populated by a plurality of completed past bids.

Table 2 depicts a diamond with a property that is worse than the target diamond and a corresponding percentage discount of the worse diamond. The eight right most columns correspond to the columns of TABLE 1. The percentages and bid value displayed in TABLE 2 are illustrative and are not intended as a strict requirement.

TABLE 2

| Pct    | 1.1%  | 5.8%  | 1.5%  | 2.7%  | 3.1%  | 3.4%  | 2.9%  |        |
|--------|-------|-------|-------|-------|-------|-------|-------|--------|
| Better | 0.32  | F     | VVS2  | —     | X     | X     | X     |        |
| BID    | 0.31 | G | VS1 | None | VG | VG | VG | 375.50 |
| Worse  | 0.30  | H     | VS2   | Faint | G     | G     | G     |        |
| Pct    | −2.0% | −7.1% | −1.2% | −2.3% | −3.4% | −3.7% | −2.9% |        |

A basket trading feature can use the same trader bids to determine an overall premium or discount for diamonds. Owners of diamond portfolios can list an entire group, priced to the market, and enter an asking price as a premium or discount. Table 2 depicts a shift in a single measurable step in each direction (better/worse) from the target diamond. In some embodiments, the steps grow or decay in bid value one a persistent percentage basis (e.g., the pct rows are the same for each measurable step). In other embodiments, each individual step has a predetermined pct value shift. Notably, some measurable steps have a more dramatic effect on bid value than others. In some cases, such as carats, the number of measurable steps is significantly larger than the number of measurable steps of other properties. Thus, the changes between measurable steps vary in granularity.

FIG. 9 illustrates a set of parameters associated with diamond search and bid 900. When searching for diamonds, a target diamond 902 is identified, and then thresholds are lined up to indicate diamond characteristics that fall within the search. The market maker system can generate a dynamic centralized limit order book by selecting diamonds with properties within a threshold range of the properties of a target diamond 902. In a search for diamonds, the properties 904 may vary. The figure depicts a single row and with a single measurable step variation in a multi-dimensional matrix with roughly 16 million potential variations (e.g., the number of combinations of different properties of diamonds). The range of which each individual property may vary is set by threshold controls 906. An example order book generated by the market maker system around a target diamond (DSC BID) is depicted.

To generate a dynamic searching order book around a target diamond 902, the market maker system can access a database or table that stores, for a plurality of diamonds, a rating of each diamond according to each of multiple properties (such as carat weight, color, clarity, fluorescence, cut, symmetry, and polish) and a bid value for that diamond with a timestamp. The market maker system selects diamonds from the database or table that have ratings within a threshold distance from at least one specified rating of the target diamond and generates the order book with the selected diamonds. The platform develops a dynamic value for each possible diamond based on existing diamond bids. Those diamonds closer to a given location in the multi-dimensional space are weighted more heavily as affecting the bid value for that space. Diamonds having a recorded bid value more recently based on time stamp have a greater weighed effect on the multi-dimensional space.

In some embodiments, the trader can select any properties 904 of the target diamond 902 that can vary when the market maker system is generating the dynamic order book. For example, the trader can specify that the market maker system should retrieve any diamonds that have a clarity that differs by less than a threshold 906 amount from the clarity of the target diamond 902, but that other properties 904 should be identical to the target diamond 902. The trader can specify that any number of the properties can deviate when the order book is generated. The trader can also indicate directions in which the selected diamonds can deviate. For example, the trader may indicate that he only wishes to see diamonds that have the same or a higher symmetry rating than the target diamond 902, while the carat weight of the selected diamonds can be both greater than and less than the weight of the target diamond.

The thresholds 906 by which the selected diamonds can vary from the properties of the target diamond 902 may be values that are preset at the market maker system, automatically chosen by the market maker system, or chosen by the trader when generating the order book. Furthermore, the threshold may be represented as a numerical value or as a number of grades. For example, a numerical threshold can be applied to the carat weight property of the target diamond; the market maker system can select, for example, any diamonds that differ from the target diamond's weight by no more than 0.1 carats. A grade number threshold can be applied, for example, to the property of cut. For example, if the target diamond's cut is rated "good," the market maker system may select any diamonds that are at most one grade level away from the target diamond 902, thus selecting any "very good" diamonds and any "fair" diamonds.

Figure 10:
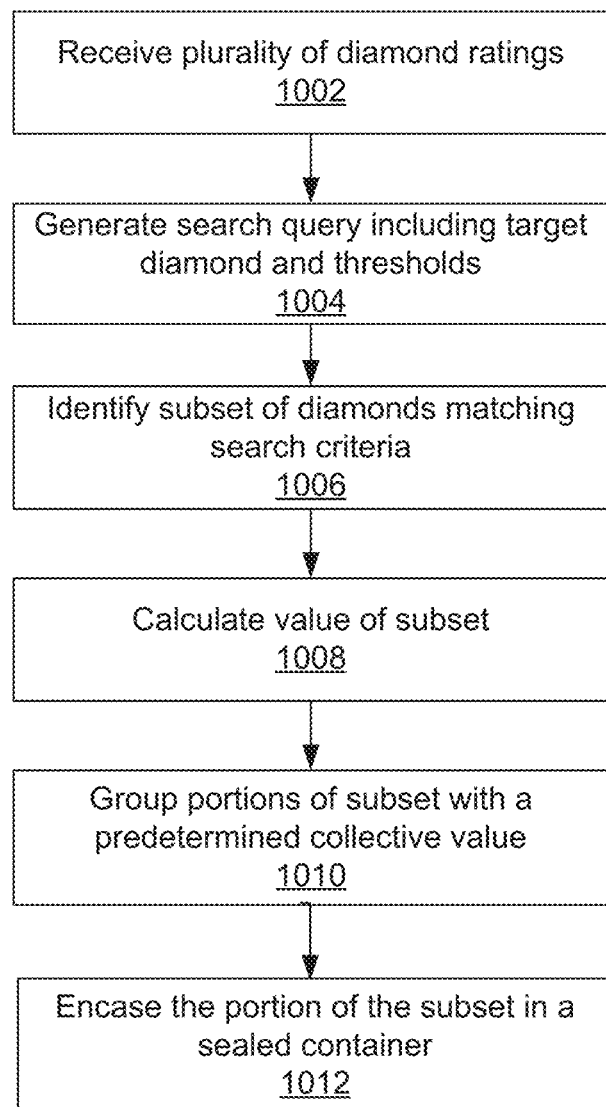
FIG. 10 a flowchart depicting a process of searching for a subset of diamonds based on a target diamond and thresholds.

FIG. 10 a flowchart depicting a process of searching for a subset of diamonds based on a target diamond and thresholds. In step 1002, a search engine system receives a plurality of diamonds. The diamonds each have ratings for a set of properties such as carats, color, clarity, flour, cut, symmetry, and polish. In step 1004, the search engine generates a search query. The search query is generally based on user input, but may be automated based on system settings. The thresholds are based on a number of measurable steps variance from the target diamond. The thresholds may differ based on whether the threshold is relevant to diamonds that are better or worse than the target diamond. For example, if the target diamond is 0.31 carats, a threshold associated with better diamonds may extend to 3 hundredths larger (e.g., three measurable steps) while the threshold associated with worse diamonds extends only a single hundredth (e.g., a single measurable step) smaller.

In step 1006, the search engine identifies a subset of the plurality of diamonds that match the target diamond or are within the property criteria thresholds. In step 1008, the search engine calculates a value for each diamond in the subset. Beginning from a value of the target diamond, each other diamond's value is calculated by applying a scalar to the current value. The for example, if a given diamond varies from the target diamond om two properties, a scalar for both of those variations is applied additively. The resulting figure is the value of the given diamond. The scalars are dynamically computed based on accepted bids In step 1010, the search engine groups the diamonds of the subset into groups having a predetermined collective value. For example, a group of diamonds from the subset may have a value of $5,000 when combined. The purpose of the collective value is to group these diamonds into a single, tamper resistant, sealed container (as described elsewhere herein). In step 1012, each collectively valued group of diamonds is sealed into a standardized, tamper resistant, sealed container (e.g., a resin puck).

Sampling Process

Figure 11:
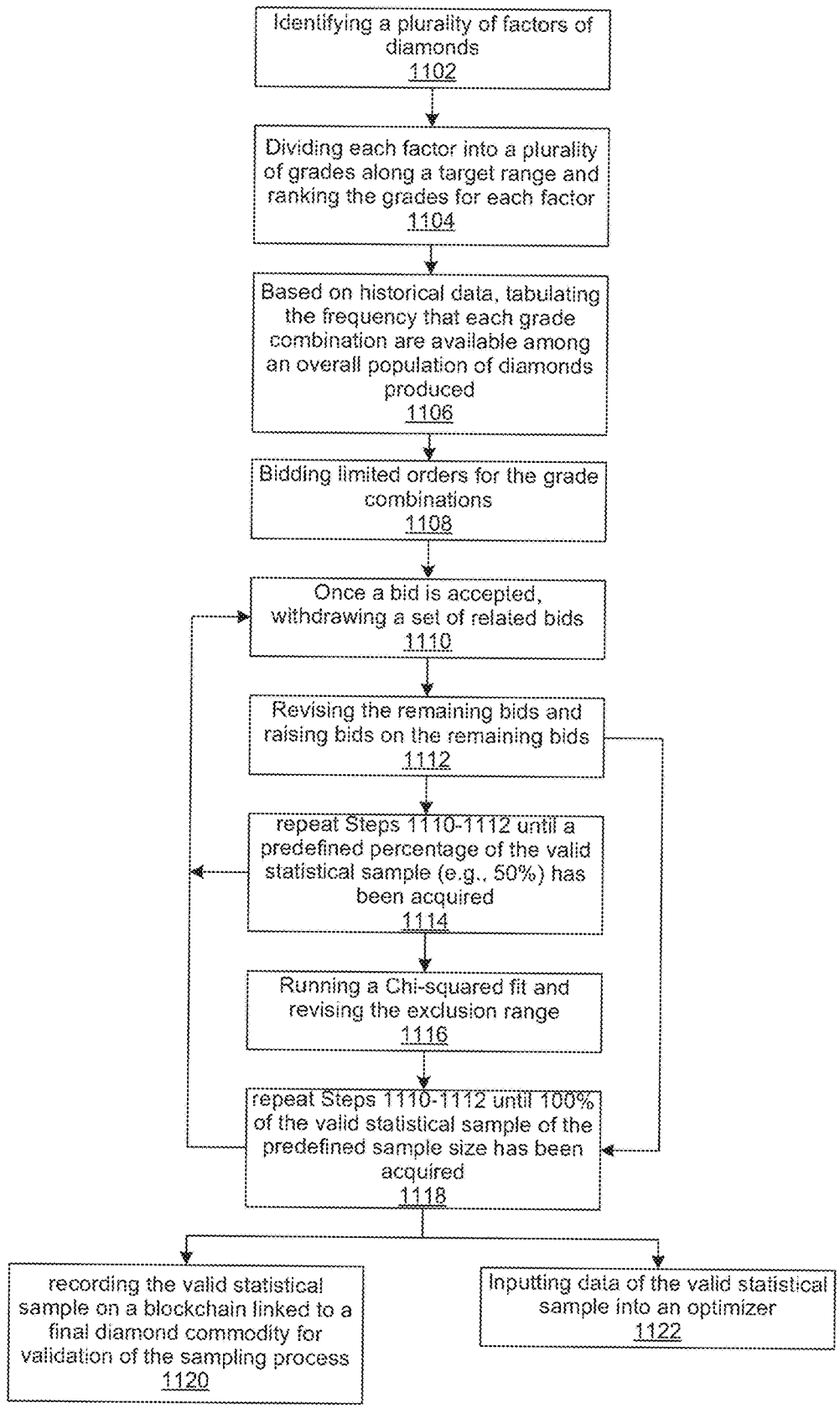
FIG. 11 shows a process used to acquire a sufficiently large and statistically valid sample of diamonds from an exchange or a group of competitive diamond suppliers.

FIG. 11 shows a process used to acquire a sufficiently large and statistically valid sample of diamonds from an exchange or a group of competitive diamond suppliers.

In an example embodiment, each sample of a predefined size (e.g., 600, 900, or 1,200 stones) will contain distribution with an identical median (e.g., +/−2%) of long-term geological scarcity. The producer of the commodity must pay "whatever it takes" to achieve such valid samples and instigates market price discovery for every diamond in the process.

Each sample is public and recorded on a blockchain linked to the final commodity, so anyone can validate that the production is fair. The diamonds of a sample are subsequently divided into nearly-equal scarcity sets of diamonds using a linear, quadratic, and integer programming optimizer, which is configured to minimize the total deviation of each set of diamonds from the permanent median, subject to various constraints, such as a count of stones, and minimum total carat weight.

According to an embodiment of the sampling process, the sample should have a Chi-Squared fit of 95% for each of the geological factors, proportional to long-term supply (i.e., scarcity) of the diamonds.

In step 1102, a plurality of geological and manufacturing factors of diamonds are identified. Geological factors include characteristics such as carat weight, color, clarity, fluorescence of a diamond; manufacturing factors include characteristics such as cut, polish, and symmetry of a diamond.

In step 1104, within a target range, each factor is divided into a plurality of grades and ranked. According to an example embodiment, if a factor is qualitative, the grades of the factor may be represented by numbers before being ranked. For instance, grades of color can be converted from D, E, F to 1, 2, 3.

In step 1006, based on scarcity of the diamonds, the historical frequency for each grade tabulated. Collectively, every possible combination of the grades of various factors potentially exceeds 16 million combinations. Some grades, while low, and less frequent due to the cost involved in grading and the overall value of the diamond. The lowest grade is often relatively rare because the cost of grading the diamond is not worth having the grade. Because of the relative scarcity, some grades will have less available data, and the lack of data is taken into account when deriving additional information therefrom.

In step 1108, using a computer having a program installed thereon configured to submit bids to purchase diamonds. One submits limited order bids for at least a substantial part of the possible number of combinations. In an example embodiment, bids are submitted for a large spread of possible combinations. Notably, there are over 16 million potential combinations. The objective to is to gather data points for which a multi-dimensional data structure storing diamond bid values may be built. The data structure is more accurate and complete through use of a wide variety of diamonds.

In step 1110, as bids are accepted by sellers, the bids for the closest-neighboring diamond types, by each factor, are withdrawn. The size of the withdrawal along each factor vector is proportional to the frequency of that factor. As shown in the example below, when the bid for the diamond in the first row is accepted, the bids for other diamonds with similar carat weight, color are withdrawn. As a result that not all of the over 16 million potential combinations of diamond properties are necessary to establish the data structure, once a minimum viable set of diamond bids are accepted, pending diamond offers within a threshold variance of the accepted bids may be abandoned. The threshold distance is predetermined from established thresholds using measurable steps from obtained diamonds.

See the below example:

Carat, Color, Clarity, Fluorescence, Cut, Symmetry, Polish
1. Accepted Bid: 0.31, G, VS1, None, VG, VG, VG
2. Withdrawn Bids: 0.30, G, VS1, None, VG, VG, VG
0.32, G, VS1, None, VG, VG, VG
0.30, H, VS1, None, VG, VG, VG
0.31, H, VS1, None, VG, VG, VG
0.32, H, VS1, None, VG, VG, VG
0.31, F, VS1, None, VG, VG, VG
, . . . , a total of 39

In step 1112, thereafter, bids for the remaining diamonds that are sufficiently different from the already purchased diamonds are raised. The process of withdrawing and raising the bids repeats until a phase-one sample (e.g., 50% of a valid sample size) is acquired.

Figure 12A:
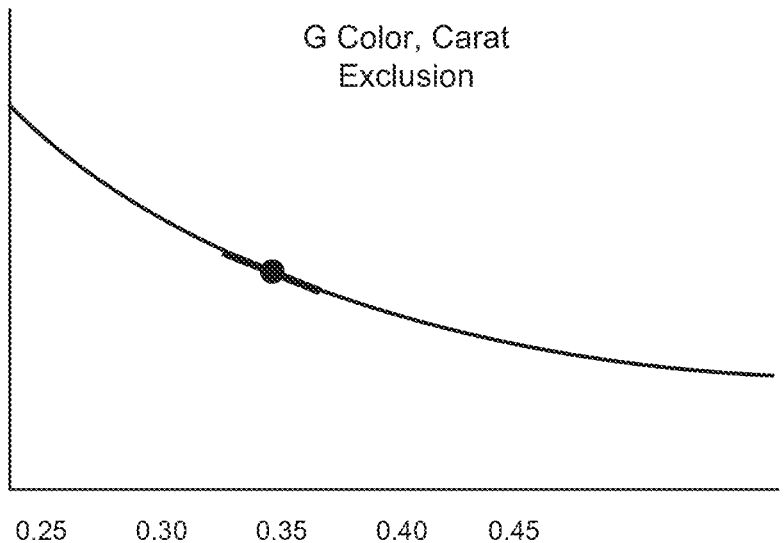
FIGS. 12A and 12B illustrate example of the exclusion ranges for a two-factor combination—the factors are color and carat weight.
Figure 12B:
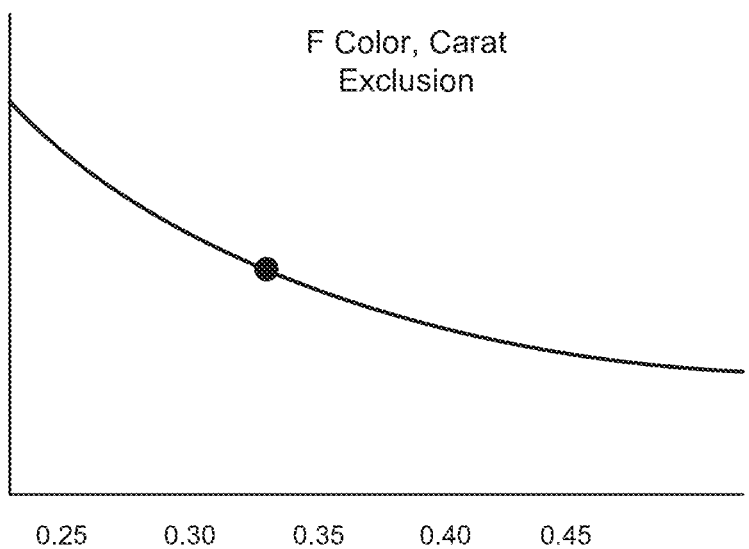

In step 1114, steps 1110 and 1112 are repeated until a phase-one sample (e.g., 50% of a valid sample size) is acquired. In step 1116, a fit analysis, such as a Chi-squared fit, is run for each factor of the sample, revealing any skews in the sample. Depending on the Chi-squared fit, exclusion ranges for each factor are increased or decreased, and additional diamonds are acquired via bidding, until a valid statistical sample is obtained. The entire sample will be a valid statistical sample, the median of which will match the median of the factor-weighted long-term supply of diamonds within the target range. FIGS. 12a and 12b illustrate example of the exclusion ranges for a two-factor combination—the factors are color and carat weight.

In step 1120, the diamonds obtained via the bidding are registered on a blockchain data structure transactional space in groupings sealed into tamper proof containers.

In step 1122, the data for the sample of diamonds is then input into a Linear Programming and Mixed-Integer optimizer configured to sort all diamonds of the sample into sets with the primary goal that the median of each set is a minimal distance from the entire sample median on a scarcity basis (such as the gemological scarcity of diamonds), subject to various constraints, such as the number of diamonds in each set and a minimum total carat weight. The output is the dynamic, multi-dimensional space describing bid values at each variation of a given diamond's properties that is used as a scaffold by the diamond search engine tool described above.

The multi-dimensional space has a weighting for each measurable step of variance of a potential diamond. The weighting is measured in dollars, as a convenient unit that can be standardize the various properties of diamonds. While dollars are used as a weighting unit, any generic unit may be similarity applied. The weighting unit enable a user of the multi-dimensional space data structure to identify the most important properties of a diamond at each potential measurable step of that property. For example, the multi-dimensional space data structure models distinctions in seemingly similar data, for example, the difference between 0.48 to 0.49 carats as opposed to 0.49 to 0.50 carats. The example refers to a property differing a single measurable step, a hundredth of a carat; however, the importance of the one measurable step difference varies based on where along a complete scale the difference is. The example distinction and others are modeled by the data structure in a manner that provides comparison in a manner humans cannot measure. The data structure enables a comparison between any two diamonds, hypothetical or real, and what the greatest contributing properties are to the difference between those two diamonds.

Figure 13:
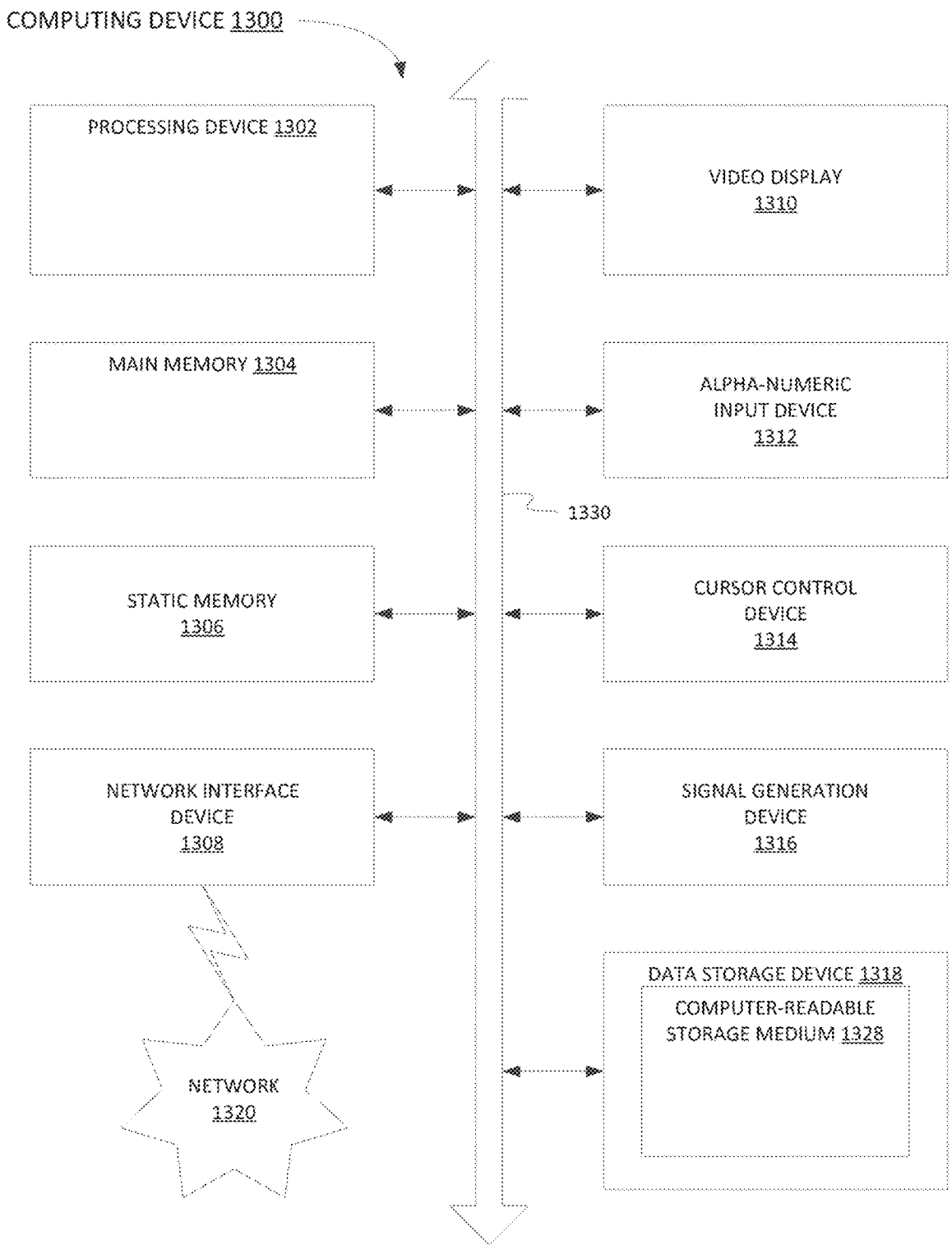
FIG. 13 illustrates a diagrammatic representation of a computing device within which a set of instructions for causing the computing device to perform the methods discussed herein may be executed.

FIG. 13 illustrates a diagrammatic representation of a computing device 1300 within which a set of instructions for causing the computing device to perform the methods discussed herein may be executed. The computing device 1300 may be connected to other computing devices in a LAN, an intranet, an extranet, and/or the Internet. The computing device 1300 may operate in the capacity of a server machine in client-server network environment. The computing device 1300 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The exemplary computing device 1300 may include a processing device (e.g., a general-purpose processor) 1302, a main memory 1304 (e.g., synchronous dynamic random-access memory (DRAM), read-only memory (ROM)), a static memory 1306 (e.g., flash memory and a data storage device 1318), which may communicate with each other via a bus 1330.

The processing device 1302 may be provided by one or more general-purpose processing devices such as a microprocessor, central processing unit, or the like. In an illustrative example, the processing device 1302 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also comprise one or more special-purpose processing devices, such as an application specific integrated circuit (ASIC), a field programmable gate array (FPGA), a digital signal processor (DSP), a network processor, or the like. The processing device 1302 may be configured to execute the methods described herein, in accordance with one or more aspects of the present disclosure.

The computing device 1300 may further include a network interface device 1308, which may communicate with a network 1320. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse) and an acoustic signal generation device 1316 (e.g., a speaker). In one embodiment, video display unit 1310, alphanumeric input device 1312, and cursor control device 1314 may be combined into a single component or device (e.g., an LCD touch screen).

The data storage device 1318 may include a computer-readable storage medium 1328 on which may be stored one or more sets of instructions (e.g., instructions of the methods described herein, in accordance with one or more aspects of the present disclosure) implementing any one or more of the methods or functions described herein. Instructions implementing methods may also reside, completely or at least partially, within main memory 1304 and/or within processing device 1302 during execution thereof by computing device 1300, main memory 1304 and processing device 1302 also constituting computer-readable media. The instructions may further be transmitted or received over a network 1320 via network interface device 1308.

While computer-readable storage medium 1328 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

From the foregoing, it will be appreciated that specific embodiments of the invention have been described herein for purposes of illustration, but that various modifications may be made without deviating from the scope of the invention.

The invention claimed is:

1. A method comprising:
   accessing a cryptographic token linked to a physical diamond commodity, the physical diamond commodity including a secured container that houses one or more diamonds, a plurality of visual taggants, and an encryption chip, the physical diamond commodity stored by a cabinet including an optical system capable of optically validating a layout of the one or more diamonds and the plurality of visual taggants within the secured container;
   querying the encryption chip to retrieve a first public key that corresponds to a first private key stored on the encryption chip;
   receiving a second public key that corresponds to a second private key of an owner of the cryptographic token;
   receiving an initial visual layout of the secured container;
   generating a smart contract using the first public key, the second public key, and the initial visual layout of the secured container, the generated smart contract configured to enable a transaction associated with the cryptographic token in response to an authorization including:
a validation of a current visual layout of the secured container received from the optical system of the cabinet against the initial visual layout of the secured container,
the first private key received from the encryption chip of the physical diamond commodity, and
the second private key associated with the owner of the physical diamond commodity; and
writing the smart contract to a blockchain.

2. The method of claim 1, wherein the cabinet is configured to communicatively couple to the encryption chip when the secured container is stored in the cabinet, and wherein querying the encryption chip comprises causing the cabinet to retrieve the first public key from the encryption chip.

3. The method of claim 1, wherein receiving the initial layout of the secured container comprises:
querying the cabinet for the initial visual layout, wherein the cabinet uses the optical system to determine the initial visual layout in response to the query.

4. The method of claim 1, wherein receiving the initial visual layout of the secured container comprises:
capturing the initial visual layout using a camera of a mobile device.

5. The method of claim 1, wherein the second private key is associated with a first cryptographic wallet, and wherein the transaction comprises transferring the cryptographic token from the first cryptographic wallet to a second cryptographic wallet.

6. The method of claim 1, wherein the blockchain is a first blockchain, and wherein the transaction comprises transferring the cryptographic token from the first blockchain to a second blockchain.

7. The method of claim 1, wherein the transaction comprises attaching a lien to the cryptographic token.

8. The method of claim 1, wherein the initial visual layout of the secured container comprises a number and position of the one or more diamonds in the secured container.

9. The method of claim 1, wherein the initial visual layout of the secured container comprises a distribution of the visual taggants in the secured container.

10. A non-transitory computer readable storage medium storing executable computer program instructions, the computer program instructions when executed by a processor causing the processor to:
access a cryptographic token linked to a physical diamond commodity, the physical diamond commodity including a secured container that houses one or more diamonds and a plurality of visual taggants, and the physical diamond commodity stored by a cabinet including an optical system capable of determining a visual layout of the one or more diamonds and the plurality of visual taggants;
query the cabinet to retrieve an initial visual layout of the secured container; and
write the cryptographic token to a blockchain using a smart contract that is configured to enable a transaction associated with the cryptographic token in response to
a validation of a current visual layout of the secured container, determined by the optical system of the cabinet, against the initial visual layout of the secured container.

11. The non-transitory computer readable storage medium of claim 10, wherein the smart contract is further configured to enable the transaction in response to validating a private key associated with an owner of the cryptographic token.

12. The non-transitory computer readable storage medium of claim 11, wherein the private key associated with the owner of the cryptographic token is linked to a first cryptographic wallet, and wherein the transaction comprises transferring the cryptographic token from the first cryptographic wallet to a second cryptographic wallet.

13. The non-transitory computer readable storage medium of claim 10, wherein the blockchain is a first blockchain, and wherein the transaction comprises transferring the cryptographic token from the first blockchain to a second blockchain.

14. The non-transitory computer readable storage medium of claim 10, wherein the transaction comprises attaching a lien to the cryptographic token.

15. The non-transitory computer readable storage medium of claim 10, wherein the computer program instructions when executed further cause the processor to:
receive a request to conduct the transaction;
in response to the request, query the cabinet to retrieve the current visual layout of the secured container;
validate the current visual layout of the secured container against the initial visual layout of the secured container; and
input the validation to the smart contract to enable the transaction.

16. The non-transitory computer readable storage medium of claim 10, wherein validating the current visual layout of the secured container against the initial visual layout of the secured container comprises:
optically validating a number and position of the one or more diamonds in the secured container.

17. The non-transitory computer readable storage medium of claim 10, wherein validating the current visual layout of the secured container against the initial visual layout of the secured container comprises:
optically validating a distribution of the visual taggants in the secured container.

18. The non-transitory computer readable storage medium of claim 10, wherein the computer program instructions when executed further cause the processor to:
receive a request to determine the current visual layout of the secured container; and
in response to the request, query the cabinet to retrieve the current visual layout of the secured container.

19. The non-transitory computer readable storage medium of claim 10, wherein the computer program instructions when executed further cause the processor to:
receive a request to conduct the transaction;
in response to receiving from the cabinet, an indication that the secured container has been removed from the cabinet, denying the request to conduct the transaction.

* * * * *